US011956267B2

(12) United States Patent
Jones et al.

(10) Patent No.: US 11,956,267 B2
(45) Date of Patent: *Apr. 9, 2024

(54) SYSTEMS FOR COMPUTER NETWORK SECURITY RISK ASSESSMENT INCLUDING USER COMPROMISE ANALYSIS ASSOCIATED WITH A NETWORK OF DEVICES

(71) Applicant: Palantir Technologies Inc., Denver, CO (US)

(72) Inventors: Samuel Jones, New York, NY (US); Joseph Staehle, New York, NY (US); Lucy Cheng, Milpitas, CA (US)

(73) Assignee: Palantir Technologies Inc., Denver, CO (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/443,272

(22) Filed: Jul. 23, 2021

(65) Prior Publication Data

US 2022/0053015 A1 Feb. 17, 2022

Related U.S. Application Data

(63) Continuation of application No. 16/035,956, filed on Jul. 16, 2018, now Pat. No. 11,089,043, which is a
(Continued)

(51) Int. Cl.
*H04L 9/40* (2022.01)
*G06F 21/55* (2013.01)
*G06F 21/57* (2013.01)

(52) U.S. Cl.
CPC .......... *H04L 63/1433* (2013.01); *G06F 21/55* (2013.01); *G06F 21/577* (2013.01);
(Continued)

(58) Field of Classification Search
CPC . H04L 63/1433; H04L 63/102; H04L 63/107; H04L 63/14; G06F 21/55
See application file for complete search history.

(56) References Cited

U.S. PATENT DOCUMENTS

| 5,724,575 A | 3/1998 | Hoover et al. |
| 5,872,973 A | 2/1999 | Mitchell et al. |
| (Continued) | | |

FOREIGN PATENT DOCUMENTS

| AU | 2014206155 | 12/2015 |
| CN | 101729531 | 6/2010 |
| (Continued) | | |

OTHER PUBLICATIONS

"The Apache Cassandra Project," http://cassandra.apache.org/ Printed Sep. 14, 2011 in 3 pages.
(Continued)

*Primary Examiner* — Jason Chiang
(74) *Attorney, Agent, or Firm* — Knobbe, Martens, Olson & Bear, LLP

(57) ABSTRACT

Methods, systems, and apparatus, including computer programs encoded on computer storage media, for computer network security risk assessment. One of the methods includes obtaining compromise likelihoods for user accounts. Information describing a network topology of a network is obtained, with the network topology being nodes each connected by an edge to other nodes, each node being associated with a compromise likelihood, and one or more nodes are high value nodes associated with a compromise value. Unique paths to each of the high value nodes are determined for a particular user account. An expected value for each path is determined based on the compromise likelihood of the particular user account, the compromise likelihood of each node included in the path, the communication weight of each edge included in the path, and the
(Continued)

compromise value associated with the high value node. User interface data is generated describing at least one path.

19 Claims, 9 Drawing Sheets

Related U.S. Application Data continuation of application No. 15/207,343, filed on Jul. 11, 2016, now Pat. No. 10,044,745.

(60) Provisional application No. 62/240,422, filed on Oct. 12, 2015.

(52) U.S. Cl.
CPC .......... *H04L 63/102* (2013.01); *H04L 63/107* (2013.01); *H04L 63/14* (2013.01); *H04L 63/1425* (2013.01)

(56) References Cited

U.S. PATENT DOCUMENTS

| | | | |
|---|---|---|---|
| 5,897,636 A | 4/1999 | Kaeser | |
| 5,951,644 A | 9/1999 | Creemer | |
| 5,978,475 A | 11/1999 | Schneier et al. | |
| 6,073,129 A | 6/2000 | Levine et al. | |
| 6,161,098 A | 12/2000 | Wallman | |
| 6,243,717 B1 | 6/2001 | Gordon et al. | |
| 6,253,203 B1 | 6/2001 | O'Flaherty et al. | |
| 6,304,873 B1 | 10/2001 | Klein et al. | |
| 6,366,933 B1 | 4/2002 | Ball et al. | |
| 6,418,438 B1 | 7/2002 | Campbell | |
| 6,499,034 B1 | 12/2002 | Mackinlay | |
| 6,510,504 B2 | 1/2003 | Satyanarayana | |
| 6,560,620 B1 | 5/2003 | Ching | |
| 6,574,635 B2 | 6/2003 | Stauber et al. | |
| 6,725,240 B1 | 4/2004 | Asad et al. | |
| 6,745,382 B1 | 6/2004 | Zothner | |
| 6,807,569 B1 | 10/2004 | Bhimani et al. | |
| 6,842,425 B1 * | 1/2005 | Mannepalli | H04L 45/12 370/255 |
| 6,976,210 B1 | 12/2005 | Silva et al. | |
| 6,980,984 B1 | 12/2005 | Huffman et al. | |
| 7,013,395 B1 * | 3/2006 | Swiler | H04L 63/1433 713/153 |
| 7,017,046 B2 | 3/2006 | Doyle et al. | |
| 7,058,648 B1 | 6/2006 | Lightfoot et al. | |
| 7,069,586 B1 | 6/2006 | Winneg et al. | |
| 7,111,231 B1 | 9/2006 | Huck et al. | |
| 7,159,023 B2 | 1/2007 | Tufts | |
| 7,194,680 B1 | 3/2007 | Roy et al. | |
| 7,225,468 B2 | 5/2007 | Waisman et al. | |
| 7,287,689 B2 | 10/2007 | Tidwell et al. | |
| 7,461,158 B2 | 12/2008 | Rider et al. | |
| 7,472,421 B2 | 12/2008 | Cummins | |
| 7,596,285 B2 | 9/2009 | Brown et al. | |
| 7,663,626 B2 | 2/2010 | Rexroad et al. | |
| 7,725,530 B2 | 5/2010 | Sah et al. | |
| 7,725,728 B2 | 5/2010 | Ama et al. | |
| 7,730,082 B2 | 6/2010 | Sah et al. | |
| 7,730,109 B2 | 6/2010 | Rohrs et al. | |
| 7,770,032 B2 | 8/2010 | Nesta et al. | |
| 7,801,871 B2 | 9/2010 | Gosnell | |
| 7,855,978 B2 | 12/2010 | Beaudoin | |
| 7,962,495 B2 | 6/2011 | Jain et al. | |
| 8,041,714 B2 | 10/2011 | Aymeloglu et al. | |
| 8,079,083 B1 * | 12/2011 | Bennett | H04L 63/1416 726/23 |
| 8,112,425 B2 | 2/2012 | Baum et al. | |
| 8,126,848 B2 | 2/2012 | Wagner | |
| 8,181,253 B1 | 5/2012 | Zaitsev et al. | |
| 8,185,819 B2 | 5/2012 | Sah et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,295,898 B2 | 10/2012 | Ashfield et al. | |
| 8,301,904 B1 | 10/2012 | Gryaznov | |
| 8,312,546 B2 | 11/2012 | Alme | |
| 8,321,958 B1 | 11/2012 | Fleming et al. | |
| 8,434,150 B2 * | 4/2013 | Xie | H04L 51/212 726/4 |
| 8,448,247 B2 | 5/2013 | Stute | |
| 8,504,542 B2 | 8/2013 | Chang et al. | |
| 8,533,319 B2 * | 9/2013 | Draugelis | H04L 63/1441 709/224 |
| 8,615,605 B2 | 12/2013 | Yu et al. | |
| 8,646,080 B2 | 2/2014 | Williamson et al. | |
| 8,676,857 B1 | 3/2014 | Adams et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,789,140 B2 * | 7/2014 | Williams | H04L 41/0853 726/3 |
| 8,881,288 B1 * | 11/2014 | Levy | G06F 21/577 709/225 |
| 8,904,506 B1 | 12/2014 | Canavor et al. | |
| 8,930,331 B2 | 1/2015 | McGrew et al. | |
| 8,931,043 B2 | 1/2015 | Cooper et al. | |
| 8,954,410 B2 | 2/2015 | Chang et al. | |
| 9,009,827 B1 | 4/2015 | Albertson et al. | |
| 9,021,260 B1 | 4/2015 | Falk et al. | |
| 9,043,696 B1 | 5/2015 | Meiklejohn et al. | |
| 9,049,117 B1 | 6/2015 | Nucci et al. | |
| 9,092,482 B1 | 7/2015 | Harris et al. | |
| 9,100,428 B1 | 8/2015 | Visbal | |
| 9,116,975 B2 | 8/2015 | Shankar et al. | |
| 9,185,095 B1 * | 11/2015 | Moritz | H04L 63/0861 |
| 9,208,159 B2 | 12/2015 | Stowe et al. | |
| 9,230,280 B1 | 1/2016 | Maag et al. | |
| 9,280,532 B2 | 3/2016 | Cicerone | |
| 9,292,695 B1 * | 3/2016 | Bassett | G06F 21/577 |
| 9,294,497 B1 * | 3/2016 | Ben-Or | H04L 63/1433 |
| 9,319,419 B2 | 4/2016 | Sprague et al. | |
| 9,335,897 B2 | 5/2016 | Goldenberg | |
| 9,338,013 B2 | 5/2016 | Castellucci et al. | |
| 9,401,925 B1 * | 7/2016 | Guo | G06F 21/552 |
| 9,407,652 B1 | 8/2016 | Kesin et al. | |
| 9,419,992 B2 | 8/2016 | Ricafort et al. | |
| 9,537,880 B1 | 1/2017 | Jones et al. | |
| 9,576,119 B2 | 2/2017 | McGeehan et al. | |
| 9,628,500 B1 | 4/2017 | Kesin et al. | |
| 9,836,499 B1 | 12/2017 | Miliauskas | |
| 9,930,055 B2 | 3/2018 | Ricafort et al. | |
| 9,965,521 B1 * | 5/2018 | Goel | G06F 16/93 |
| 10,044,745 B1 | 8/2018 | Jones et al. | |
| 11,089,043 B2 | 8/2021 | Jones et al. | |
| 2001/0051949 A1 | 12/2001 | Carey et al. | |
| 2002/0091694 A1 | 7/2002 | Hrle et al. | |
| 2002/0112157 A1 | 8/2002 | Doyle et al. | |
| 2003/0105759 A1 | 6/2003 | Bess et al. | |
| 2003/0115481 A1 | 6/2003 | Baird et al. | |
| 2003/0120675 A1 | 6/2003 | Stauber et al. | |
| 2003/0212718 A1 | 11/2003 | Tester | |
| 2004/0003285 A1 * | 1/2004 | Whelan | H04W 12/122 726/29 |
| 2004/0111410 A1 | 6/2004 | Burgoon et al. | |
| 2004/0117345 A1 | 6/2004 | Bamford et al. | |
| 2004/0117387 A1 | 6/2004 | Civetta et al. | |
| 2004/0123139 A1 | 6/2004 | Aiello et al. | |
| 2004/0128508 A1 * | 7/2004 | Wheeler | H04L 63/0442 713/176 |
| 2004/0148301 A1 | 7/2004 | McKay et al. | |
| 2004/0153418 A1 | 8/2004 | Hanweck | |
| 2004/0250124 A1 | 12/2004 | Chesla et al. | |
| 2005/0050196 A1 * | 3/2005 | Aita | H04L 43/0811 709/239 |
| 2005/0097441 A1 | 5/2005 | Herbach et al. | |
| 2005/0108231 A1 | 5/2005 | Findleton et al. | |
| 2005/0114763 A1 | 5/2005 | Nonomura et al. | |
| 2005/0125295 A1 | 6/2005 | Tidwell et al. | |
| 2005/0157662 A1 | 7/2005 | Bingham et al. | |
| 2005/0229256 A2 | 10/2005 | Banzhof | |

(56) References Cited

U.S. PATENT DOCUMENTS

| | | |
|---|---|---|
| 2005/0262556 A1 | 11/2005 | Waisman et al. |
| 2005/0275638 A1 | 12/2005 | Kolmykov-Zotov et al. |
| 2005/0289524 A1 | 12/2005 | McGinnes |
| 2006/0021049 A1* | 1/2006 | Cook .................. G06F 21/577 726/25 |
| 2006/0031928 A1 | 2/2006 | Conley et al. |
| 2006/0069912 A1 | 3/2006 | Zheng et al. |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0116991 A1 | 6/2006 | Calderwood |
| 2006/0156407 A1* | 7/2006 | Cummins ................ G06F 21/55 726/25 |
| 2006/0161558 A1 | 7/2006 | Tamma et al. |
| 2006/0179003 A1 | 8/2006 | Steele et al. |
| 2006/0212931 A1 | 9/2006 | Shull et al. |
| 2006/0218206 A1 | 9/2006 | Bourbonnais et al. |
| 2006/0218491 A1 | 9/2006 | Grossman et al. |
| 2006/0218637 A1 | 9/2006 | Thomas et al. |
| 2006/0242630 A1 | 10/2006 | Koike et al. |
| 2006/0253502 A1 | 11/2006 | Raman et al. |
| 2006/0265324 A1* | 11/2006 | Leclerc ............... H04L 63/1433 705/38 |
| 2006/0265397 A1 | 11/2006 | Bryan et al. |
| 2006/0265747 A1 | 11/2006 | Judge |
| 2006/0265751 A1* | 11/2006 | Cosquer ............. H04L 63/1416 726/25 |
| 2007/0050429 A1 | 3/2007 | Goldring et al. |
| 2007/0061487 A1 | 3/2007 | Moore et al. |
| 2007/0067846 A1* | 3/2007 | McFarlane ........... G06F 21/577 726/25 |
| 2007/0143253 A1 | 6/2007 | Kostamaa et al. |
| 2007/0143851 A1 | 6/2007 | Nicodemus |
| 2007/0157315 A1* | 7/2007 | Moran ............... H04L 63/1425 726/23 |
| 2007/0185850 A1 | 8/2007 | Walters et al. |
| 2007/0214115 A1 | 9/2007 | Liu et al. |
| 2007/0233756 A1 | 10/2007 | D'Souza et al. |
| 2007/0271317 A1 | 11/2007 | Carmel |
| 2007/0294766 A1 | 12/2007 | Mir et al. |
| 2008/0005555 A1* | 1/2008 | Lotem .................. G06F 21/55 713/150 |
| 2008/0015970 A1 | 1/2008 | Brookfield et al. |
| 2008/0082380 A1* | 4/2008 | Stephenson ........... G06Q 10/06 726/25 |
| 2008/0104149 A1 | 5/2008 | Vishniac et al. |
| 2008/0104407 A1 | 5/2008 | Horne et al. |
| 2008/0195672 A1 | 8/2008 | Hamel et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2008/0270316 A1 | 10/2008 | Guidotti et al. |
| 2008/0301378 A1 | 12/2008 | Carrie |
| 2009/0024549 A1* | 1/2009 | Johnson ................. H04L 43/00 706/46 |
| 2009/0031247 A1 | 1/2009 | Walter et al. |
| 2009/0066540 A1* | 3/2009 | Marinakis ............. H05B 47/22 340/909 |
| 2009/0103442 A1 | 4/2009 | Douville |
| 2009/0106308 A1 | 4/2009 | Killian et al. |
| 2009/0154376 A1* | 6/2009 | Okamoto ........... H04L 12/4679 370/255 |
| 2009/0164387 A1 | 6/2009 | Armstrong et al. |
| 2009/0177962 A1 | 7/2009 | Gusmorino et al. |
| 2009/0228474 A1* | 9/2009 | Chiu .................... G06F 16/248 707/999.005 |
| 2009/0228701 A1 | 9/2009 | Lin |
| 2009/0254971 A1 | 10/2009 | Herz |
| 2009/0271435 A1 | 10/2009 | Yako et al. |
| 2009/0292743 A1 | 11/2009 | Bigus et al. |
| 2009/0313223 A1 | 12/2009 | Rantanen |
| 2009/0313311 A1 | 12/2009 | Hoffmann et al. |
| 2009/0319832 A1 | 12/2009 | Zhang et al. |
| 2009/0328222 A1 | 12/2009 | Helman et al. |
| 2010/0024017 A1 | 1/2010 | Ashfield et al. |
| 2010/0036831 A1 | 2/2010 | Vemuri et al. |
| 2010/0076939 A1 | 3/2010 | Iwaki et al. |
| 2010/0077481 A1 | 3/2010 | Polyakov et al. |
| 2010/0082541 A1 | 4/2010 | Kottomtharayil |
| 2010/0100963 A1 | 4/2010 | Mahaffey |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0179831 A1 | 7/2010 | Brown et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0235915 A1 | 9/2010 | Memon et al. |
| 2010/0262688 A1 | 10/2010 | Hussain et al. |
| 2010/0283787 A1 | 11/2010 | Hamedi et al. |
| 2010/0325581 A1 | 12/2010 | Finkelstein et al. |
| 2010/0330801 A1 | 12/2010 | Rouh |
| 2011/0029498 A1 | 2/2011 | Ferguson et al. |
| 2011/0047540 A1 | 2/2011 | Williams et al. |
| 2011/0060910 A1 | 3/2011 | Gormish et al. |
| 2011/0110633 A1 | 5/2011 | Erlendsson |
| 2011/0153592 A1 | 6/2011 | DeMarcken |
| 2011/0173619 A1 | 7/2011 | Fish |
| 2011/0184813 A1 | 7/2011 | Barne et al. |
| 2011/0202555 A1 | 8/2011 | Cordover et al. |
| 2011/0219450 A1 | 9/2011 | McDougal et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2011/0277025 A1* | 11/2011 | Counterman ........... G06F 21/40 726/8 |
| 2011/0288660 A1 | 11/2011 | Wojsznis et al. |
| 2011/0295982 A1* | 12/2011 | Misra ................. H04L 63/1425 726/23 |
| 2011/0296003 A1 | 12/2011 | McCann et al. |
| 2012/0072825 A1 | 3/2012 | Sherkin et al. |
| 2012/0079592 A1 | 3/2012 | Pandrangi |
| 2012/0084866 A1 | 4/2012 | Stolfo |
| 2012/0110633 A1 | 5/2012 | An et al. |
| 2012/0110674 A1 | 5/2012 | Belani et al. |
| 2012/0123989 A1 | 5/2012 | Yu et al. |
| 2012/0124092 A1* | 5/2012 | Teranishi ........... G06F 21/6218 707/783 |
| 2012/0136804 A1 | 5/2012 | Lucia |
| 2012/0150791 A1 | 6/2012 | Willson |
| 2012/0169593 A1 | 7/2012 | Mak et al. |
| 2012/0185419 A1 | 7/2012 | Kuhn et al. |
| 2012/0198489 A1 | 8/2012 | O'Connell et al. |
| 2012/0218305 A1 | 8/2012 | Patterson et al. |
| 2012/0254129 A1 | 10/2012 | Wheeler et al. |
| 2012/0266245 A1 | 10/2012 | McDougal et al. |
| 2012/0284791 A1 | 11/2012 | Miller et al. |
| 2012/0304244 A1 | 11/2012 | Xie et al. |
| 2012/0323829 A1 | 12/2012 | Stokes et al. |
| 2012/0330801 A1 | 12/2012 | McDougal et al. |
| 2012/0330908 A1 | 12/2012 | Stowe et al. |
| 2013/0019306 A1 | 1/2013 | Lagar-Cavilla et al. |
| 2013/0036346 A1 | 2/2013 | Cicerone |
| 2013/0097130 A1 | 4/2013 | Bingol et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0151388 A1 | 6/2013 | Falkenborg et al. |
| 2013/0239217 A1 | 9/2013 | Kindler et al. |
| 2013/0254833 A1 | 9/2013 | Nicodemus et al. |
| 2013/0254885 A1* | 9/2013 | Devost ................. G06F 21/56 726/23 |
| 2013/0275416 A1 | 10/2013 | Thomson et al. |
| 2013/0304770 A1 | 11/2013 | Boero et al. |
| 2013/0318060 A1 | 11/2013 | Chang et al. |
| 2013/0318616 A1* | 11/2013 | Christodorescu ..... G06F 21/552 726/25 |
| 2014/0013451 A1 | 1/2014 | Kulka et al. |

(56) References Cited

U.S. PATENT DOCUMENTS

| | | | |
|---|---|---|---|
| 2014/0053265 A1 | 2/2014 | Crowley | |
| 2014/0059683 A1 | 2/2014 | Ashley | |
| 2014/0082691 A1 | 3/2014 | Warn et al. | |
| 2014/0123279 A1 | 5/2014 | Bishop et al. | |
| 2014/0143009 A1 | 5/2014 | Brice et al. | |
| 2014/0149272 A1 | 5/2014 | Hirani et al. | |
| 2014/0173712 A1 | 6/2014 | Ferdinand | |
| 2014/0173738 A1 | 6/2014 | Condry et al. | |
| 2014/0181833 A1 | 6/2014 | Bird et al. | |
| 2014/0181968 A1 | 6/2014 | Ge et al. | |
| 2014/0188895 A1 | 7/2014 | Wang et al. | |
| 2014/0201345 A1 | 7/2014 | Abuelsaad et al. | |
| 2014/0229422 A1 | 8/2014 | Jain et al. | |
| 2014/0279684 A1* | 9/2014 | Liao | G06Q 40/06 705/36 R |
| 2014/0283107 A1 | 9/2014 | Walton et al. | |
| 2014/0344231 A1 | 11/2014 | Stowe et al. | |
| 2014/0366132 A1 | 12/2014 | Stiansen et al. | |
| 2015/0039565 A1 | 2/2015 | Lucas | |
| 2015/0089353 A1 | 3/2015 | Folkening | |
| 2015/0089568 A1 | 3/2015 | Sprague et al. | |
| 2015/0106347 A1 | 4/2015 | McGrew et al. | |
| 2015/0112956 A1 | 4/2015 | Chang et al. | |
| 2015/0128274 A1 | 5/2015 | Giokas | |
| 2015/0150125 A1* | 5/2015 | Dulkin | H04L 63/1433 726/22 |
| 2015/0188715 A1 | 7/2015 | Castelluci et al. | |
| 2015/0212663 A1 | 7/2015 | Papale et al. | |
| 2015/0227295 A1 | 8/2015 | Meiklejohn et al. | |
| 2015/0229664 A1 | 8/2015 | Hawthorn et al. | |
| 2015/0235152 A1* | 8/2015 | Eldardiry | G06F 21/552 705/7.28 |
| 2015/0248563 A1 | 9/2015 | Alfarano et al. | |
| 2015/0261817 A1 | 9/2015 | Harris et al. | |
| 2015/0261847 A1 | 9/2015 | Ducott et al. | |
| 2015/0326601 A1 | 11/2015 | Grondin et al. | |
| 2015/0341379 A1* | 11/2015 | Lefebvre | H04L 43/0894 726/22 |
| 2016/0004864 A1 | 1/2016 | Falk et al. | |
| 2016/0028759 A1 | 1/2016 | Visbal | |
| 2016/0034545 A1 | 2/2016 | Shankar et al. | |
| 2016/0050224 A1 | 2/2016 | Ricafort et al. | |
| 2016/0062555 A1 | 3/2016 | Ward et al. | |
| 2016/0191532 A1* | 6/2016 | Seiver | H04L 43/0876 726/4 |
| 2017/0003352 A1 | 1/2017 | Barre et al. | |
| 2017/0099311 A1 | 4/2017 | Kesin et al. | |
| 2017/0111381 A1 | 4/2017 | Jones et al. | |
| 2017/0195354 A1 | 7/2017 | Kesin et al. | |
| 2017/0302531 A1* | 10/2017 | Maes | H04L 63/20 |
| 2018/0159874 A1 | 6/2018 | Ricafort et al. | |
| 2018/0173813 A1 | 6/2018 | Spiro et al. | |

FOREIGN PATENT DOCUMENTS

| | | |
|---|---|---|
| CN | 103281301 | 9/2013 |
| EP | 0652513 | 5/1995 |
| EP | 1589716 | 10/2005 |
| EP | 1962222 | 8/2008 |
| EP | 2284769 | 2/2011 |
| EP | 2555126 | 2/2013 |
| EP | 2863326 | 4/2015 |
| EP | 2891992 | 7/2015 |
| EP | 2892197 | 7/2015 |
| EP | 2897051 | 7/2015 |
| EP | 2963578 | 1/2016 |
| EP | 2985974 | 2/2016 |
| EP | 2993595 | 3/2016 |
| EP | 3110104 | 12/2016 |
| EP | 3133522 | 2/2017 |
| NL | 2011642 | 8/2015 |
| WO | WO 2005/010685 | 2/2005 |
| WO | WO 2012/025915 | 3/2012 |

OTHER PUBLICATIONS

"Apache HBase," http://hbase.apache.org/ printed Sep. 14, 2011 in 1 page.
Anonymous, "BackTult—JD Edwards One World Version Control System", in 1 page, Jul. 23, 2007.
Antoshenkov, Gennady, "Dictionary-Based Order-Preserving String Compression", The VLDB Journal, pp. 26-39, 1997.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Baker et al., "The Development of a Common Enumeration of Vulnerabilities and Exposures," Presented at the Second International Workshop on Recent Advances in Intrusion Detection, Sep. 7-9, 1999, p. 35.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Bhuyan et al., "Network Anomaly Detection: Methods, Systems and Tools," First Quarter 2014, IEEE.
Chang et al., "Bigtable: A Distributed Storage System for Structured Data", Google, Inc., OSDI'06: Seventh Symposium on Operating System Design and Implementation, Seattle, WA, Nov. 2006.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Crosby et al., "Efficient Data Structures for Tamper-Evident Logging," Department of Computer Science, Rice University, 2009, pp. 17.
Devanbu et al., "Authentic Third-party Data Publication", http://www.cs.ucdavis.edu/~devanbu/authdbpub.pdf, p. 19, 2000.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Elmasri et al., "Fundamentals of Database Systems", Fourth Edition, pp. 455-491, 2004.
FireEye—Products and Solutions Overview, http://www.fireeye.com/products-and-solutions Printed Jun. 30, 2014 in 3 pages.
Fireeye, http://www.fireeye.com/ Printed Jun. 30, 2014 in 2 pages.
Glaab et al., "EnrichNet: Network-Based Gene Set Enrichment Analysis," Bioinformatics 28.18 (2012): pp. i451-i457.
Hogue et al., "Thresher: Automating the Unwrapping of Semantic Content from the World Wide Web", 14th International Conference on World Wide Web, WWW 2005: Chiba, Japan, May 10-14, 2005.
Huang et al., "Systematic and Integrative Analysis of Large Gene Lists Using DAVID Bioinformatics Resources," Nature Protocols, 4.1, 2008, 44-57.
Hur et al., "SciMiner: web-based literature mining tool for target identification and functional enrichment analysis," Bioinformatics 25.6 (2009): pp. 838-840.
Klemmer et al., "Where Do Web Sites Come From? Capturing and Interacting with Design History," Association for Computing Machinery, CHI 2002, Apr. 20-25, 2002, Minneapolis, MN, p. 8.
Kokossi et al., "D7-Dynamic Ontology Management System (Design)", Information Societies Technology Programme, pp. 1-27.
Lee et al., "A Data Mining and CIDF Based Approach for Detecting Novel and Distributed Intrusions," Lecture Notes in Computer Science, vol. Nov. 11, 1907, 2000, pp. 49-65.
Ma et al., "A New Approach to Secure Logging," ACM Transactions on Storage, vol. 5, No. 1, Article 2, Published Mar. 2009, 21 pages.
Mentzas et al., "An Architecture for Intelligent Assistance in the Forecasting Process", Proceedings of the Twenty-Eighth Hawaii International Conference on System Sciences, vol. 3, pp. 167-176, Jan. 3- 6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.

(56) References Cited

OTHER PUBLICATIONS

Niepert et al., "A Dynamic Ontology for a Dynamic Reference Work", Joint Conference on Digital Libraries, pp. 1-10, Vancouver, British Columbia, Jun. 17-22, 2007.
Nierman, "Evaluating Structural Similarity in XML Documents", 6 pages, 2002.
Peng et al., "Large-scale Incremental Processing Using Distributed Transactions and Notifications",Proceedings of the 9th USENIX Symposium on Operating Systems Design and Implementation, USENIX, p. 14, 2010.
Quest, "Toad for ORACLE 11.6—Guide to Using Toad", pp. 1-162, Sep. 24, 2012.
Schneier et al., "Automatic Event Stream Notarization Using Digital Signatures," Security Protocols,International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Virus Total—About, http://www.virustotal.com/en/about/ Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System", Conference on Object-Oriented Technologies and Systems, pp. 219-231, Jun. 17-21, 1996.
Yang et al., "HTML Page Analysis Based on Visual Cues", A129, pp. 859-864, 2001.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/982,699 dated Oct. 7, 2016.
Notice of Allowance for U.S. Appl. No. 13/196,788 dated Dec. 18, 2015.
Notice of Allowance for U.S. Appl. No. 13/826,228 dated Mar. 27, 2015.
Notice of Allowance for U.S. Appl. No. 14/033,076 dated Mar. 11, 2016.
Notice of Allowance for U.S. Appl. No. 14/223,918 dated Jan. 6, 2016.
Notice of Allowance for U.S. Appl. No. 14/278,963 dated Sep. 2, 2015.
Notice of Allowance for U.S. Appl. No. 14/280,490 dated Nov. 26, 2014.
Notice of Allowance for U.S. Appl. No. 14/451,221 dated Aug. 4, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/504,103 dated May 18, 2015.
Notice of Allowance for U.S. Appl. No. 14/731,312 dated Jul. 19, 2016.
Notice of Allowance for U.S. Appl. No. 14/746,671 dated Jan. 21, 2016.
Notice of Allowance for U.S. Appl. No. 14/823,935 dated Apr. 25, 2016.
Notice of Allowance for U.S. Appl. No. 14/849,454 dated May 25, 2016.
Notice of Allowance for U.S. Appl. No. 14/970,317 dated May 26, 2016.
Notice of Allowance for U.S. Appl. No. 15/207,343 dated Apr. 3, 2018.
Notice of Allowance for U.S. Appl. No. 15/224,443 dated Dec. 19, 2016.
Notice of Allowance for U.S. Appl. No. 15/227,854 dated Jun. 30, 2017.
Notice of Allowance for U.S. Appl. No. 15/228,297 dated Nov. 24, 2017.
Notice of Allowance for U.S. Appl. No. 15/462,540 dated May 10, 2018.
Official Communication for European Patent Application No. 14189344.6 dated Feb. 20, 2015.
Official Communication for European Patent Application No. 14199180.2 dated Jun. 22, 2015.
Official Communication for European Patent Application No. 14199180.2 dated Aug. 31, 2015.
Official Communication for European Patent Application No. 14199182.8 dated Mar. 13, 2015.
Official Communication for European Patent Application No. 15175106.2 dated Nov. 5, 2015.
Official Communication for European Patent Application No. 15180985.2 dated Jan. 15, 2016.
Official Communication for European Patent Application No. 15180985.2 dated Mar. 30, 2017.
Official Communication for European Patent Application No. 15183721.8 dated Nov. 23, 2015.
Official Communication for European Patent Application No. 16176273.7 dated Oct. 21, 2016.
Official Communication for European Patent Application No. 16184823.9 dated May 23, 2018.
Official Communication for European Patent Application No. 16184823.9 dated Nov. 24, 2016.
Official Communication for European Patent Application No. 17155145.0 dated Aug. 31, 2017.
Official Communication for European Patent Application No. 18161005.6 dated Apr. 11, 2018.
Official Communication for Netherlands Patent Application No. 2012436 dated Nov. 6, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 14/033,076 dated Aug. 13, 2015.
Official Communication for U.S. Appl. No. 14/033,076 dated Nov. 6, 2015.
Official Communication for U.S. Appl. No. 14/223,918 dated Jun. 8, 2015.
Official Communication for U.S. Appl. No. 14/278,963 dated Jan. 30, 2015.
Official Communication for U.S. Appl. No. 14/280,490 dated Jul. 24, 2014.
Official Communication for U.S. Appl. No. 14/451,221 dated Apr. 6, 2015.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.

(56) References Cited

OTHER PUBLICATIONS

Official Communication for U.S. Appl. No. 14/578,389 dated Oct. 21, 2015.
Official Communication for U.S. Appl. No. 14/580,218 dated Jun. 26, 2015.
Official Communication for U.S. Appl. No. 14/726,211 dated Apr. 5, 2016.
Official Communication for U.S. Appl. No. 14/731,312 dated Apr. 14, 2016.
Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/816,748 dated Apr. 1, 2016.
Official Communication for U.S. Appl. No. 14/816,748 dated May 24, 2016.
Official Communication for U.S. Appl. No. 14/823,935 dated Dec. 4, 2015.
Official Communication for U.S. Appl. No. 14/841,338 dated Feb. 18, 2016.
Official Communication for U.S. Appl. No. 14/923,712 dated Feb. 12, 2016.
Official Communication for U.S. Appl. No. 14/923,712 dated Jun. 17, 2016.
Official Communication for U.S. Appl. No. 14/970,317 dated Mar. 21, 2016.
Official Communication for U.S. Appl. No. 14/982,699 dated Mar. 25, 2016.
Official Communication for U.S. Appl. No. 14/982,699 dated Aug. 26, 2016.
Official Communication for U.S. Appl. No. 15/071,064 dated Jun. 16, 2016.
Official Communication for U.S. Appl. No. 15/207,343 dated May 17, 2017.
Official Communication for U.S. Appl. No. 15/207,343 dated Nov. 23, 2016.
Official Communication for U.S. Appl. No. 15/207,343 dated Sep. 27, 2017.
Official Communication for U.S. Appl. No. 15/224,443 dated Dec. 19, 2016.
Official Communication for U.S. Appl. No. 15/227,854 dated Mar. 3, 2017.
Official Communication for U.S. Appl. No. 15/228,297 dated Jun. 30, 2017.
Official Communication for U.S. Appl. No. 15/395,483 dated Sep. 21, 2017.
Official Communication for U.S. Appl. No. 15/395,483 dated Mar. 28, 2018.
Official Communication for U.S. Appl. No. 15/395,483 dated Jul. 6, 2017.
Official Communication for U.S. Appl. No. 15/462,540 dated Oct. 13, 2017.
Official Communication for U.S. Appl. No. 15/462,540 dated Jul. 5, 2017.
Official Communication for U.S. Appl. No. 15/659,152 dated Apr. 4, 2018.
Official Communication for U.S. Appl. No. 15/838,658 dated Mar. 8, 2018.

\* cited by examiner

A FIRST PATH THE USER ACCOUNT CAN TAKE TO ACCESS
THE HIGH VALUE NODE

SYSTEMS FOR COMPUTER NETWORK SECURITY RISK ASSESSMENT INCLUDING USER COMPROMISE ANALYSIS ASSOCIATED WITH A NETWORK OF DEVICES

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Networks are commonly utilized to connect an organization's, e.g., a company's, computer systems and electronically stored information. The organization can utilize components, e.g., routers, to receive connection requests from network devices, e.g., computer systems, and route the requests to appropriate devices that can handle the requests. Networks can include thousands or millions of network devices, with thousands or millions of user accounts permitted to access the network devices.

System administrators, e.g., people that set up and maintain networks, can attempt to separate their networks such that certain users/devices cannot access other parts of the network. To effect this separation, system administrators can utilize firewalls to block access, and utilize access control lists that identify user accounts expressly permitted to access particular network devices.

SUMMARY

Particular embodiments of the subject matter described in this specification can be implemented so as to realize one or more of the following advantages. A system can efficiently determine a network topology describing connections between network devices of a network, and user accounts permitted to access each network device. The system can then automatically quantify expected value costs associated with a user account being compromised. For instance, the system can determine probabilities of high valued network devices (e.g., network devices storing valuable information) being improperly accessed by compromised user accounts, and determine an expected value of loss incurred by a company that controls the network. The system can automatically determine weaknesses in the network, such as insecure paths from an initial network device to a high value network device, and a system administrator can take actions to rectify the weaknesses. In this way, a company can monitor risks to its network, and update network devices to strengthen an insecure path to a high value network device.

An example embodiment includes a computerized method for determining security risks of a network that includes user accounts accessing different network devices included in the network, the method comprising: by a computing device having one or more computer processors and a non-transitory computer readable storage device storing software instruction for execution by the one or more computer processors, receiving information indicating respective compromise likelihoods of a set of user accounts of the network; obtaining information describing a network topology of the network, wherein the network topology comprises a plurality of nodes each connected by an edge to one or more of the plurality of nodes, each node being associated with a compromise likelihood, each edge being associated with a communication weight, and wherein one or more nodes are high value nodes; determining, for a particular user account of the set of user accounts, expected values associated with one or more unique paths to a particular high value node of the one or more high value nodes based on the received information describing the network topology and the compromise likelihood of the particular user account; and generating user interface data describing at least one unique path.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
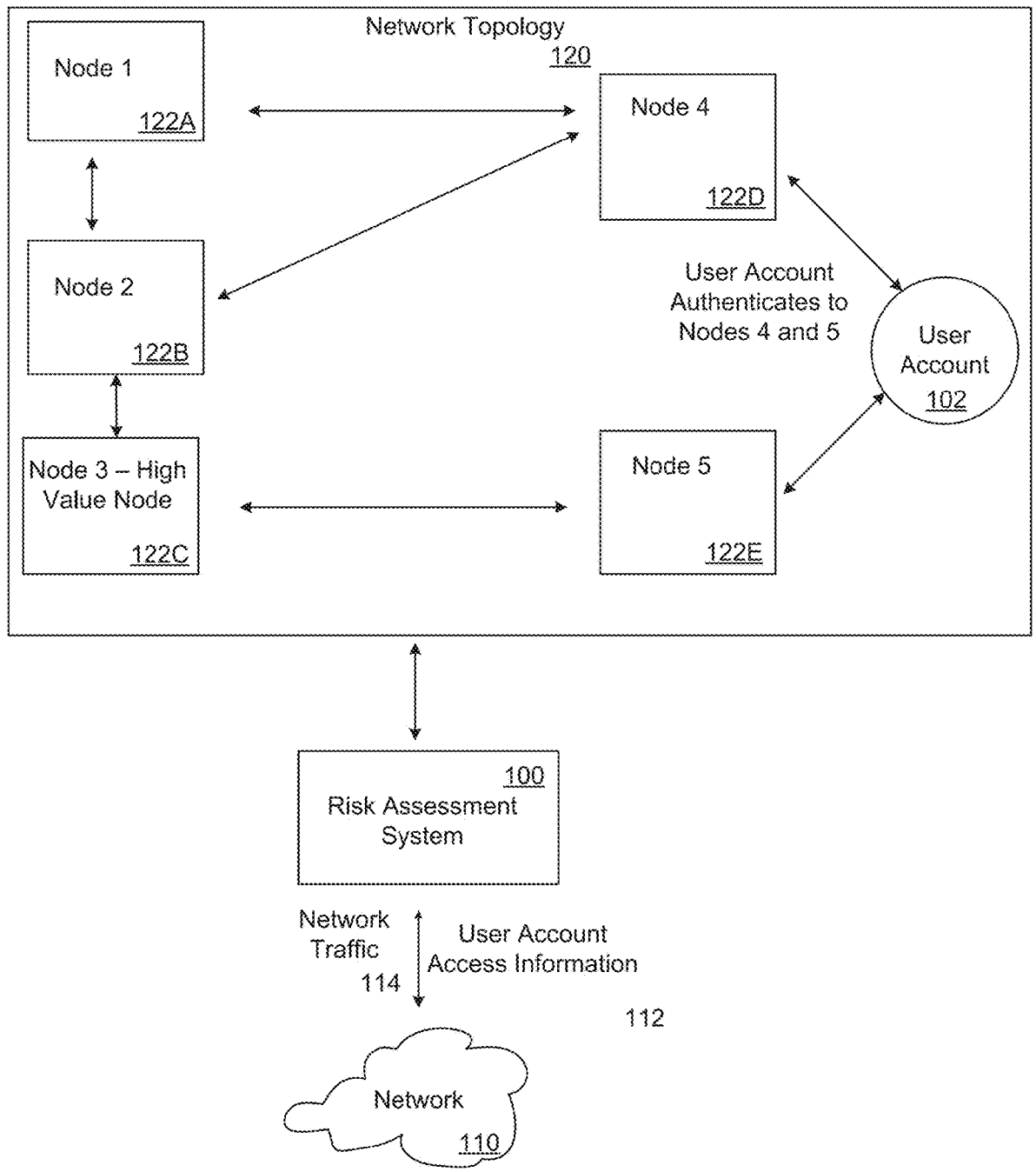
FIG. 1 illustrates a risk assessment system in communication with a network and an example of a determined network topology describing connections between different entities on the network (e.g., user accounts, assets such as network devices).

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Overview

This specification describes techniques to determine quantifiable costs (e.g., a monetary loss, a loss of good will, or any quantifiable loss) associated with user accounts (e.g., compromised by a malicious actor) compromising high value network devices. In particular, a system can determine a network topology of a network including nodes, indicating respective network devices in the network, connected by edges, indicating: communication events or potential communication events between the nodes, or nodes that a same user account can access (e.g., authenticate to). The system can determine, or obtain, information indicating compromise values associated with particular nodes (e.g., quantifiable costs of the information stored in particular nodes being compromised), and determine likelihoods of user accounts being able to improperly access high valued nodes. In this specification, a high value node is a node that stores information that if compromised, would cause a company to incur an expense greater than a threshold (e.g., a user selectable threshold).

To effect this determination, the system can determine one or more paths, that each include a unique combination of nodes included in the network topology, that a user would need to traverse to ultimately access a high value node. A path is a series of nodes connected by edges, which ultimately end at a high value node. For instance, a path can begin at a node a user account is known to authenticate to, or is able to authenticate to. The path can then move to subsequent nodes (e.g., connected by edges) until a high value node is reached, for instance a subsequent node can be moved to according to the user account being able to access the subsequent node (e.g., authenticate to the subsequent node), or a subsequent node can be moved to according to communication events between the node and the subsequent node. Each node along the path can be associated with a compromise likelihood, and each edge connecting two nodes can be associated with a communication weight indicating a probability of transition (e.g., a measure of how commonly two nodes communicate with each other). In this specification, a compromise likelihood is a probability that a node can be improperly accessed (e.g., by a malicious actor). A transition from a first node to a subsequent node along a path can also involve a user account switching to a different user account to gain access to the subsequent node, to which the user account does not have access. The different user account can be associated with escalated user privileges, and the path can then move to subsequent nodes the different user can access.

The system can then determine a total compromise likelihood of each path, which indicates a probability that a user can access the high value node by following the path. The system can select a path with the greatest total compromise likelihood, and combine the total compromise likelihood with the compromise value associated with the high value node, to determine an expected value of a user account being able to access the high value node. That is, an expected value can indicate an expected financial loss, weighted by a likelihood of the financial loss, of a user account accessing a high value node.

In this way, the system can determine a worst-case path (e.g., greatest expected value), and a user (e.g., a system administrator) can review the worst-case path to determine whether the worst-case path can be improved. For instance, the user (e.g., system administrator) can update operating system software on nodes, reduce access rights to nodes by user accounts, and so on.

Additionally, the system can determine compromise likelihoods of user accounts, and can modify the expected value of the high value node being compromised with the compromise likelihood of a user account. For instance, a particular user account can have permissions to access a node close to the high value node (e.g., less than a few nodes away from the high value node in the network topology). By modifying the expected value with the compromise likelihood of the particular user account, a system administrator can determine whether the particular user account should have reduced permissions, or should be more difficult to access.

Additionally, the system administrator can model a malicious actor transitioning to different user accounts, by factoring in compromise likelihood of the transition, and then compromise likelihoods of the nodes included in a path to a high value node. For instance, a malicious actor might compromise a first user account with low permissions (e.g., group permissions), and then access one or more nodes included in the network topology. Upon accessing a particular node, the malicious actor can transition to a user account with greater permissions (e.g., the malicious actor can escalate permissions), and then utilize the transitioned to user account to access a high value node.

The described system can provide information (e.g., to a system administrator in a user interface), describing the complex path including compromise likelihoods for each node and user account involved in the path to the high value node, and an expected value of the path.

Determining a Network Topology and Compromise Likelihoods of Nodes

The system can determine the network topology (e.g., network devices and the connections between those network devices) of a network using network traffic between the network devices in the network. Network devices can include servers, laptops, desktops, storage device, routers, point of sale machines, and so on. The network traffic can include router logs, e.g., network flow data describing communications between network devices, firewall logs, e.g., data identifying network devices that are permitted to access particular other network devices, and proxy logs, e.g., data describing network devices that request or receive information through a proxy server. The system can utilize the network traffic to identify unique network devices, and connections from each unique network device to other unique network devices.

After determining a network topology, the system can determine nodes included in the network topology that user accounts are known to authenticate to, or can authenticate to.

For instance, the system can obtain user account access information (or simply "access information") for each network device. "Access information," as used herein, refers generally to any information describing a level of access that a user account has within a network. For instance, access information can include information regarding a particular user account's access rights and/or actual accesses to nodes in a network topology. Such access information may be determined based on access privileges and/or access records. In general, "access privileges," as used herein, refers to any rules or information that is used to control what a user can access. Access privileges may be implemented using a list of rules that apply to a specific node (or other object, such as a file, folder, printer, etc.) that defines which user accounts or groups of user accounts have access to that object. An Access Control List (ACL) is one example of access privileges. Group membership information is an example of access privileges indicating groups user accounts can access. "Access records," as used herein, generally refers to information indicating actual accesses by a network device, such as to other specific network devices and/or particular directories, files, etc., within the network. Examples of access records include those maintained by directory services, such as MICROSOFT ACTIVE DIRECTORY service, and can be culled from access logs of network devices, firewalls, virtual private network logs, and so on.

After determining a network topology, the system can determine communication events between each node in the network topology, and determine a relative communication weight to describe how commonly each node communicates with another node. For instance, the system can determine, from network logs and communication traffic, that a particular node is in frequent communication with another node, indicating that two associated network devices communicate frequently. The system can determine that the edge between the particular node and other node should be assigned a high communication weight. As will be described below, a communication weight can be used to indicate a probability that a malicious actor will follow an edge vs another edge with a different communication weight (e.g., a random walk probability).

The system can then determine a compromise likelihood of each node in the network topology. In this specification, a compromise likelihood is a probability of successfully accessing (e.g., improperly accessing) a node. The compromise likelihood can be determined, for instance, from known vulnerabilities on a node (e.g., vulnerabilities, or exploits, publicly known such as exploits assigned scores according to the Common Vulnerability Scoring System, privately known, such as by security officers associated with the network).

As will be described below, the system can determine compromise likelihoods of each node from a current state of the node, such as applications installed or otherwise executing on the node, a current operating system (e.g., particular operating systems may be considered less secure than others), operating system version (e.g., the operating system may not be fully patched or otherwise up to date), operating system type (e.g., a server operating system, a consumer focused operating system), and so on.

Determining network topologies and compromise likelihoods are further described in U.S. patent application Ser. No. 14/585,043, titled "SYSTEMS FOR NETWORK RISK ASSESSMENT INCLUDING PROCESSING OF USER ACCESS RIGHTS ASSOCIATED WITH A NETWORK OF DEVICES," the entirety of which is hereby incorporated by reference.

Determining Compromise Likelihoods of User Accounts

Additionally, the system can determine compromise likelihoods of user accounts from information describing aggregate, or present, indications of user behavior that are indicative of, alone or in combination with other types of user behavior, of the user account being compromised (e.g., the system can determine and utilize historical user behavior). For instance, if a user account is commonly accessed from a number of disparate hosts (e.g., laptops, personal computers, tablets) that is abnormal, or greater than a threshold, for an average user account (e.g., a measure of central tendency), then the user account can be associated with a greater compromise likelihood.

To determine user behavior, the system can obtain information describing network actions of user accounts. In this specification, network actions can include any action that affects a network device, or user account, including accessing a network device from a particular host, creating a new user account, executing code on a network devices, escalating privileges of one or more user accounts, a user account switching to a different user account (e.g., a privileged account), and so on. The network actions can be obtained, and determined, from virtual private network (VPN) logs, Active Directory (AD) logs, firewall logs, user account access records, system logs including keystrokes pressed, mouse movements, touch inputs received, processes or code executed on a network device, user accounts that accessed or disconnected from the system, and so on.

The system can compare user behavior of a user account to one or more models identifying average (e.g., a measure of central tendency of) user behavior of other user accounts associated with a business (e.g., a same employee role). Additionally, the system can obtain historical information associated with each user account (e.g., past user behavior of the user account), and compare the user behavior of each user account to its historical information.

User behavior can be measured in a variety of ways, for instance measures associated with a particular user account can include:

A number of network devices from which a user of the particular user account accessed the particular user account.

A likelihood that a single user has accessed the particular user account from disparate locations in a period of time. For instance, if the particular user account was accessed in a first remote session from a first location (e.g., Austin, Texas), and a short period of time later (e.g., 15 minutes), accessed from a second location (e.g., San Francisco, California), the likelihood can indicate that one user could not travel fast enough between those two locations to effect the two remote sessions.

A measure of risk associated with the locations from which the particular user account was accessed. For instance, a particular geographic region can be known (e.g., to a system administrator) to be associated with malicious activity.

A measure of risk associated with a user account transitioning to a privileged user account (e.g., a rarely used privileged user account), or transitioning to disparate user accounts in a quick succession (e.g., within a selectable period of time).

A measure of risk associated with a user account executing unknown processes, or processes known to be malicious, on a network device.

To determine a compromise likelihood, user behavior for a particular user account can be combined into an overall likelihood. In some implementations, the compromise likelihood of the particular user account is a convolution of a weighted sum of the user behavior measures taken over time with a user selectable window size.

Determining user behavior and an overall likelihood are further described in U.S. patent application Ser. No. 14/982,699 titled "ANOMALOUS NETWORK MONITORING, USER BEHAVIOR DETECTION AND DATABASE SYSTEM," the entirety of which is hereby incorporated by reference.

Example System Architecture and Network Topology

FIG. 1 illustrates a risk assessment system 100 in communication with a network 110 and an example of a determined network topology 120. The risk assessment system 100 (e.g., a system of one or more computers, or software executing on a system of one or more computers, also referred to herein as "the system,") is configured to determine the network topology 120 from network traffic 114, e.g., router logs, firewall logs, proxy logs, router rules, of network devices included in a network 100. The risk assessment system 100 can be used, or operated, by a system administrator, e.g., an IT staffer, Chief Technology Officer, Chief Security Officer, technology consultant, manager, and so on. Thus, any reference to a "system administrator" or "administrator" herein should be interpreted to include any one or more of these individuals or groups of individuals, or any other entity that views and interacts with the various user interfaces disclosed herein.

The illustrated example of FIG. 1 includes five nodes, e.g., nodes 1-5 122A-E, with each node including one or more network devices. Each node was determined by the risk assessment system 100 to be included in the network 110. The risk assessment system 100 has also identified connections between each of the five nodes, e.g., node 3 122C and node 5 122E have communicated, by analyzing the network traffic 114.

The risk assessment system 100 has determined that Node 3 122C is a high value node, indicating that Node 3 122C stores information that is of a high value to a company or organization. For instance, Node 3 122C can store personal information of consumers or employees, or can include trade secrets and so on. In some implementations, the risk assessment system 100 can obtain information indicating that Node 3 122C is a high value node (e.g., from a system administrator or other employee of a business). In some implementations, the risk assessment system 100 can determine the high value status based on a type of network device associated with Node 3 122C (e.g., Node 3 122C can be a point of sale device that processes consumer financial data), or based on types of information, coupled with a quantity of the type of information, stored by Node 3 122C (e.g., personal information, credit card data, and so on).

The risk assessment system 100 has also determined that User Account 102 has authenticated to, or is permitted to authenticate to, Node 4 122D and Node 5 122E.

As illustrated in FIG. 1, User Account 102 can access Node 5 122E, and Node 5 122E is in communication with the high value Node 3 122C. The traversal from Node 5 to Node 3 can represent a unique path that the User Account 102 can take to access the high value Node 3 122C. Similarly, the User Account 102 can traverse a different path, by authenticating to Node 4 122D, and then accessing Node 2 122B and subsequently the high value Node 3 122C. Alternatively, the User Account 102 can authenticate to Node 4 122D, and then access Node 1 122A, Node 2 122B, and subsequently the high value Node 3 122C.

As will be described below, each of the paths described above can be associated with a total compromise likelihood, indicating a likelihood that the User Account 102 can access the high value Node 3 122C utilizing the path.

Example Network Topology User Interfaces

Figure 2A:
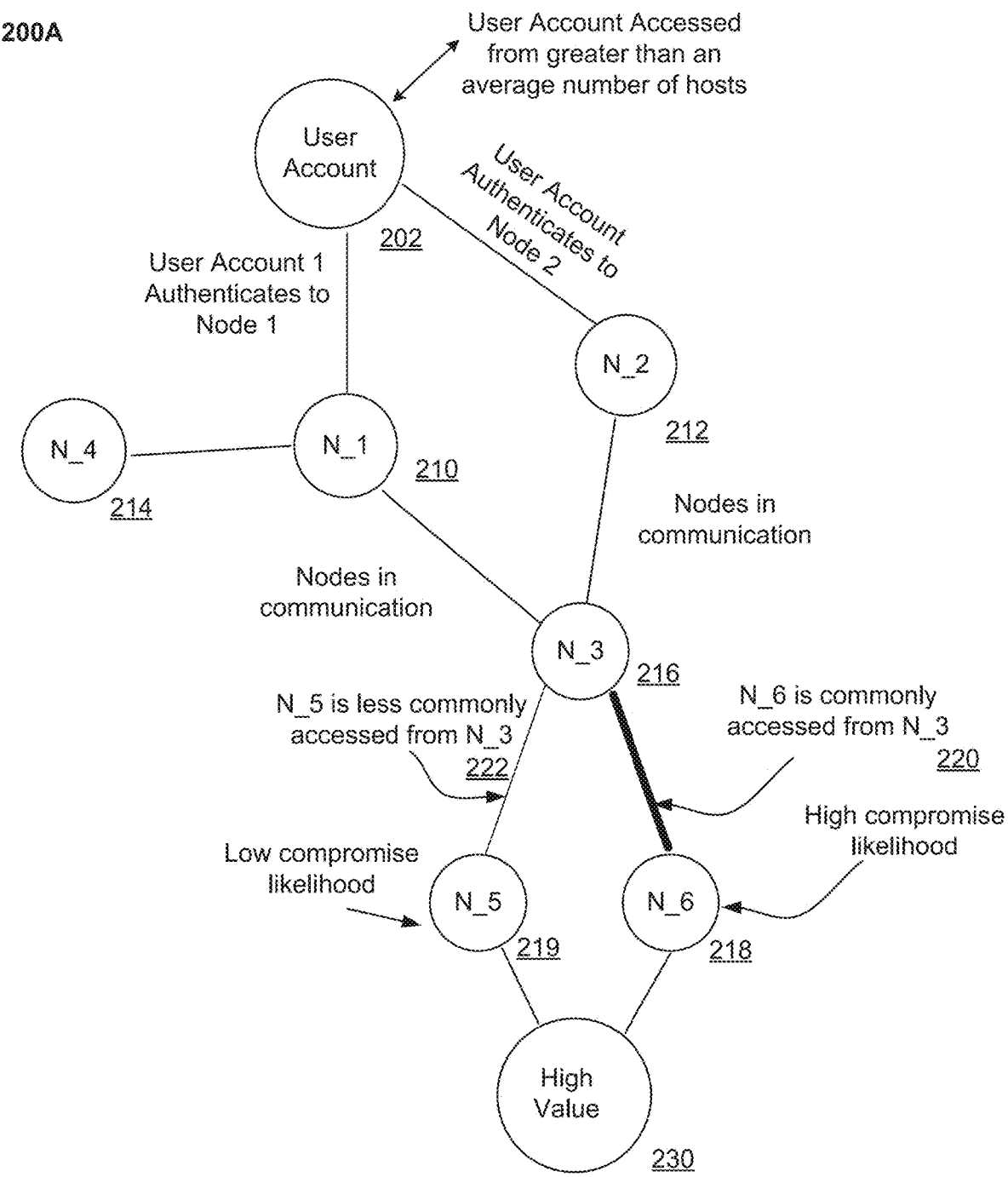
FIG. 2A illustrates a representation of a portion of a network topology that includes a high value node.

FIG. 2A illustrates a representation 200A of a portion of a network topology that includes a high value node 230 and a User Account 202. In some implementations, FIG. 2A can be an example user interface generated by the risk assessment system 100 (e.g., for presentation to a system administrator).

In some implementations, a system administrator can select the high value node 230 and User Account 202 (e.g., as a part of a separate investigation). In the illustration of FIG. 2A, information indicating that the User Account 202 has been accessed from greater than an average number of hosts is included, which can indicate that the User Account 202 has been compromised, or has a greater likelihood of being compromised than other user accounts. A system administrator can review identifications of user accounts with user behavior indicative of the user account being compromised, or at risk of being compromised. After review, the system administrator can select the particular User Account 202 to obtain information describing paths the User Account 202 can take to access a high value node 230.

In some implementations, the User Account 202 can be automatically selected based on determining that a compromise likelihood of the User Account 202 is greater than a threshold. The selection can occur upon the risk assessment system 100 determining a ranking of the user accounts according to respective risk (e.g., compromise likelihoods). As will be described below, the risk assessment system 100 can monitor user accounts, and identify user accounts for review by a system administrator upon determining that their respective compromise likelihoods have exceeded a threshold.

In the example of FIG. 2A, the User Account 202 is illustrated along with nodes included in the network topology that are included in paths to the high value node 230. The risk assessment system 100 has determined that the User Account 202 can authenticate to, or has authenticated to, Node 1 210 and Node 2 212. Each of these two nodes is in communication with Node 3 216, that is, communication events have occurred between the nodes (e.g., as determined from access logs, and so on).

Node 3 216 is further in communication with Node 5 219 and Node 6 218. As illustrated in FIG. 2A, communication events between Node 6 218 and Node 3 216 occur at a much higher frequency, or with a greater total occurrence, than between Node 5 219 and Node 3 216 (e.g., in a period of time). The representation 200A reflects this greater occurrence by assigning a greater communication weight to the edge connecting Node 3 216 and Node 6 218 than the edge connecting Node 3 216 and Node 5 219. Therefore, the User Account 202 is more likely to access the high value node 230 using a path that goes through Node 3 216 and Node 6 218, since communication events are more common between these nodes. In implementations where FIG. 2A, is a user interface, a system administrator can quickly identify that a malicious actor compromising the User Account 202 is more likely to attempt to access Node 6 218 from Node 3 216, than to access Node 5 219, by viewing the thickness of the respective edges. Additionally, in some implementations, a numerical value assigned as a respective communication weight can be provided in the FIG. 2A.

The high value node 230 is in communication with both Node 5 219 and Node 6 218, indicating that a malicious actor can utilize either Node 5 219 or Node 6 218 to access the high value node.

As will be described below, the risk assessment system can determine expected values of each path the User Account 202 can take to access the high value node 230. To determine an expected value, the risk assessment system 202 can multiply a total compromise likelihood of the User Account 202 accessing the high value node 230 using a path, by the compromise value associated with the high value node 230. To effect this determination, the risk assessment system 100 can determine a total compromise likelihood from a compromise likelihood of the User Account 202, communication weights between nodes in a path, and compromise likelihoods of the nodes in the path.

As will be described more fully below, in some implementations to determine a total compromise likelihood of a path, the intersection of all the compromise likelihoods for nodes included in the path can be determined. However, in some cases, multiple nodes included in a path might execute the same operating system type, or might have the same known vulnerabilities (e.g., a software vulnerability), or be in need of the same, or similar software patches. In these cases, a malicious actor that has successfully accessed a node, can be assumed to be able to access additional nodes that can be compromised using similar vulnerabilities (e.g., the nodes might all execute an out of date version of an operating system). Thus, the total compromise likelihood of the path can utilize a single node's compromise likelihood, in place of multiple nodes, when determining the intersection.

After determining expected values for each path to the high value node 230, the risk assessment system 100 can select the highest expected value, and provide information describing the selected path to a system administrator.

Additional methods of determining a total compromise likelihood can be utilized, including modeling the network topology as a Markov Chain with the communication weights indicating respective probabilities of the malicious actor selecting a next node to access, and the compromise likelihood of each node indicating a probability of successfully accessing the node.

Figure 2B:
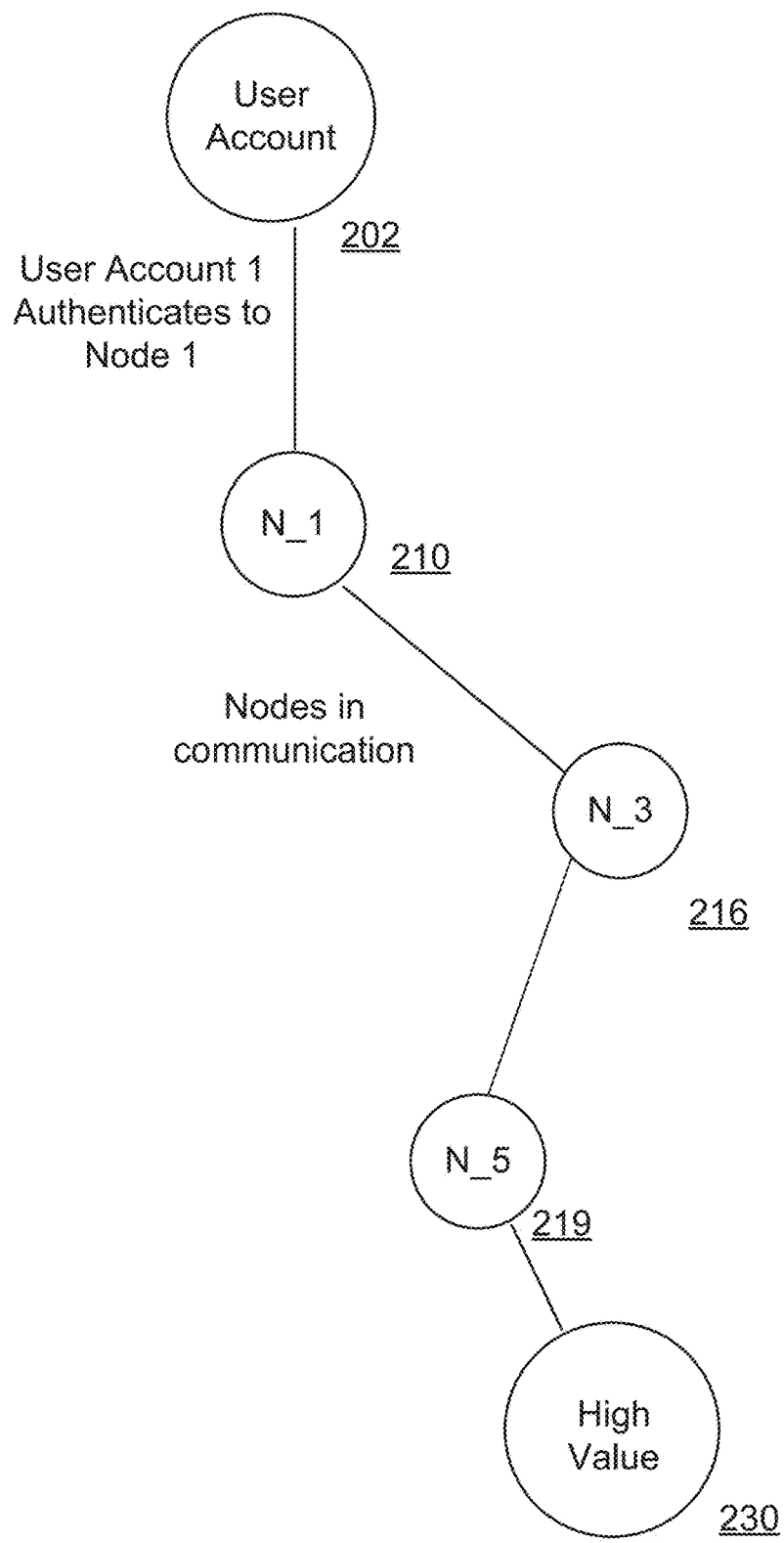
FIG. 2B illustrates a representation of a first path the User Account can take through nodes to access the high value node.

FIG. 2B illustrates a representation of a first path the User Account 202 can take through nodes to access the high value node 230. As illustrated, the User Account 202 can authenticate to Node 1 210, and access Node 3 216 to Node 5 219, and then to the high value node 230.

Figure 2C:
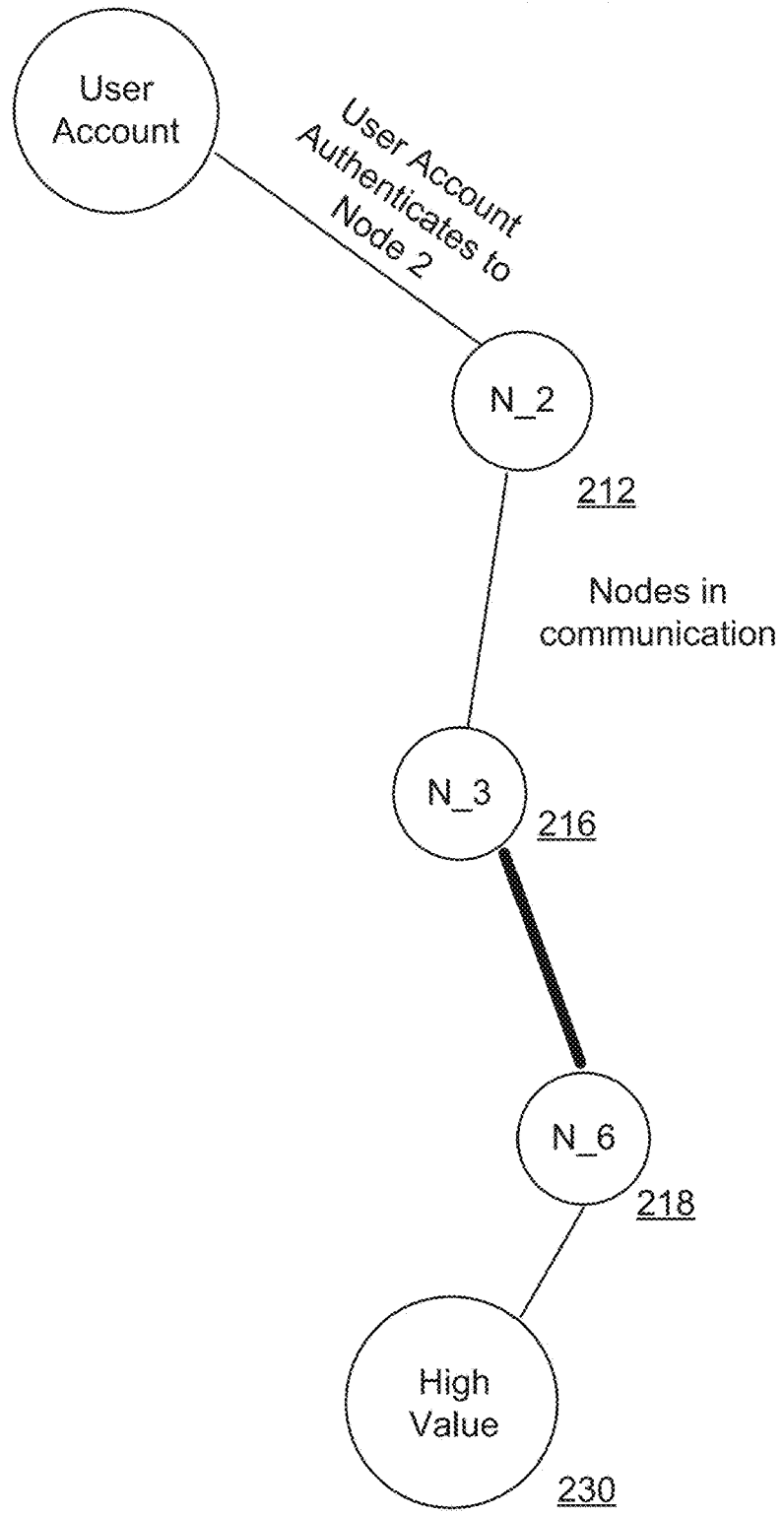
FIG. 2C illustrates a representation of a second path the user account can take through nodes to access the high value node.

FIG. 2C illustrates a representation of a second path the user account can take through nodes to access the high value node 230. As illustrated, the User Account 202 can authenticate to Node 2 212, and access Node 3 216 to Node 6 218, and then to the high value node 230.

As described above, the risk assessment system can select a path (e.g., the first path or the second path) that is determined to have a highest expected value of compromise. Since path two (e.g., as illustrated in FIG. 2C) includes a higher compromise likelihood of Node 6 218 (e.g., as compared to Node 5 219 in FIG. 2B), and further includes a greater communications weight, indicating that communications between Node 3 and Node 6 are more likely than between Node 3 and Node 5, the risk assessment system 100 can select path 2 as having the highest expected value.

After selection, the risk assessment system 100 can provide information (e.g., to a system administrator as a user interface) describing the expected value, including a quantifiable cost, information describing the associated path, and so on.

Figure 2D:
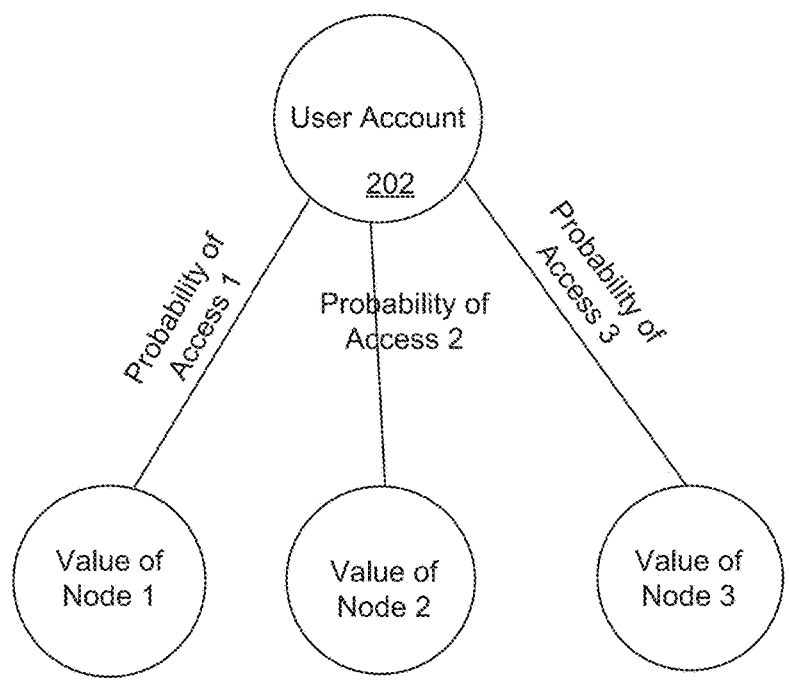
FIG. 2D illustrates a representation of summary data of the User Account accessing disparate high value nodes.

FIG. 2D illustrates a representation 250A of summary data of the User Account 202 accessing disparate high value nodes. In some implementations, FIG. 2D can be a user interface generated by the risk assessment system 100, that can be provided to a system administrator for review (e.g., the system administrator can select the User Account 202). As illustrated, the representation 250A includes three high value nodes, and total compromise likelihoods (e.g., "Probability of Access" as illustrated) associated with accessing each high value node. In some implementations, the risk assessment system 100 can select the different high value nodes as nodes with compromise values greater than a threshold (e.g., a user selectable threshold), or the system 100 can select a threshold number of nodes with highest compromise values.

As described above, the total compromise likelihood of each high value node is selected as the path to the high value node that is associated with a highest expected value. In implementations in which the representation 250A is a user interface, a system administrator can review the representation 250A and quickly identify likelihoods of the User Account 202 accessing the disparate high value nodes. Furthermore, the user interface can be configured to be selectable, and upon selection of a high value node, the user interface can be updated to illustrate the path the User Account 202 could take to the selected high value node. In this way, the system administrator can identify the nodes included in the path, and take actions to lower the total compromise likelihood of the path.

Furthermore, FIG. 2D illustrates a total expected value of the User Account 202 being compromised. That is, the representation 250A includes the computation:

Total Expected Value=(Prob. Of Access 1*Value of
Node 1)+(Prob. Of Access 2*value of Node
2)+(Prob. Of Access 3*Value of Node 3)

The total expected value identifies a quantifiable risk of the User Account 202 being compromised and accessing the three disparate high value nodes.

Example Network Configuration

Figure 3:
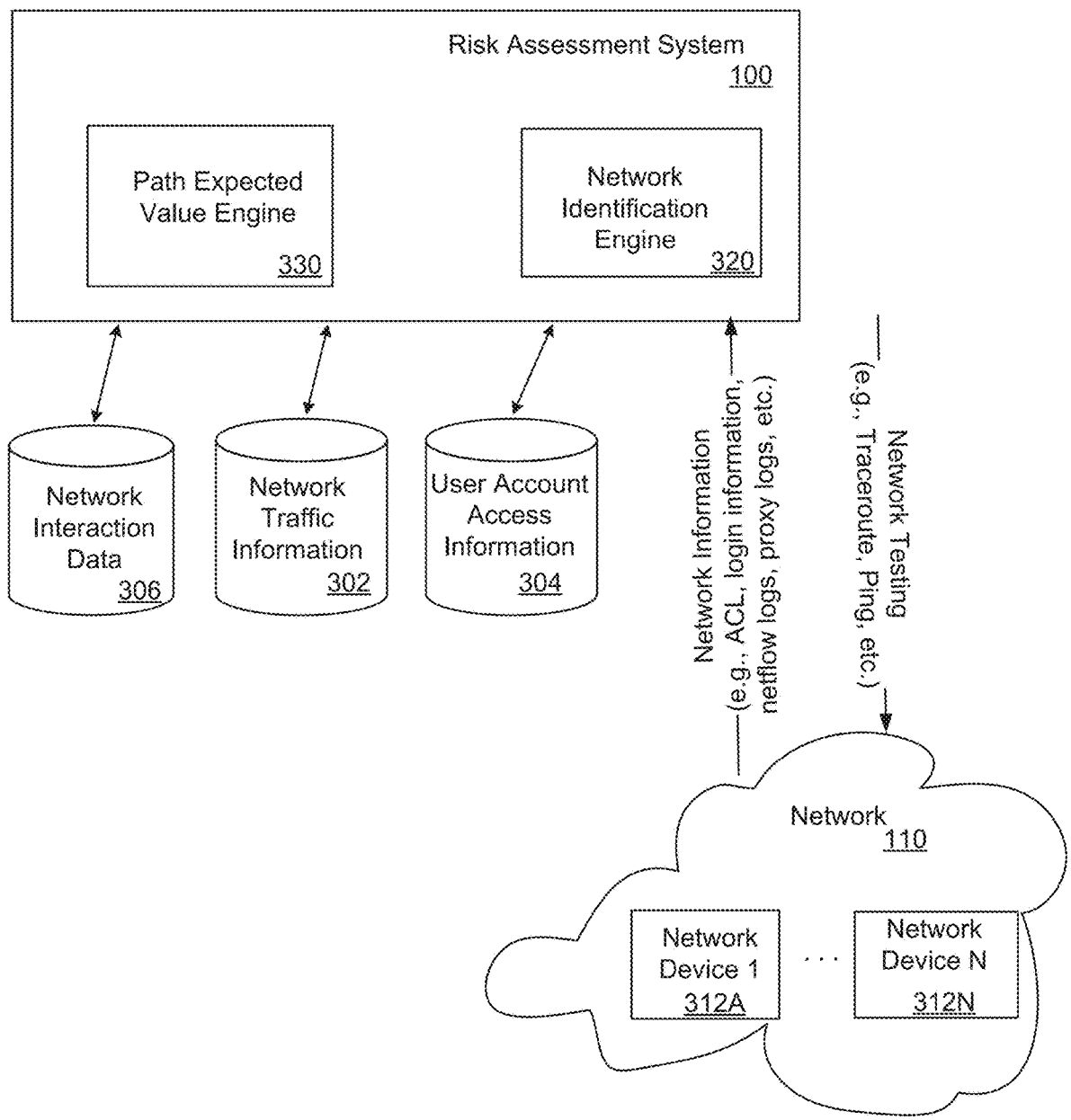
FIG. 3 illustrates a diagram of the risk assessment system in communication with the network.

FIG. 3 illustrates a diagram of the risk assessment system 100 in communication with the network 110, which includes one or more network devices (e.g., network devices 312A-312N). In some implementations, the risk assessment system 100 can be a network device included in the network 110, or can be software executing on a network device.

The risk assessment system 100 is in communication with, or maintains, one or more databases storing network traffic information and user account access information, e.g., the network traffic information database 302, the user account access information database 304, and the network interaction database 306.

In one embodiment, the network traffic information database 302 stores router logs, e.g., network traffic data describing communications between network devices such as NETFLOW data, firewall logs, e.g., data identifying network devices that are permitted to access particular other network devices, and/or proxy logs, e.g., data describing network devices that request or receive information through a proxy server. Additionally, the risk assessment system 100 can provide requests, e.g., traceroute requests or pings, to network devices included in the network 110, and receive identifications of network devices that the request was routed through. In this way the risk assessment system 100 can actively identify network devices in communication with each other, e.g., network devices that can provide information to, or receive information from, other network devices.

In one embodiment, the user account access information database 304 stores access information describing a level of access that a user account, e.g., a user account of the network 110, has with a network device included in the network 110. For instance, user account access information can include identifications of user accounts that are permitted to access a network device, e.g., log into the network device, or user accounts that can request data from or send data to a network device, e.g., ping the network device. The information can be obtained from access rights associated with respective nodes of the network 110. For example, rights of each network node in an Access Control List ("ACL") may be parsed in order to determine, for each user account, which network nodes the user account can access. The user account access information may also include information obtained from access records particular to each network node included in the network 110, e.g., information identifying user accounts that have accessed a network device, or directory information identifying user accounts.

In one embodiment, the network interaction database 306 stores information obtained from network devices (e.g., server systems, domain controllers, computers, laptops, checkout systems, point of sale systems, firewalls, virtual private network (VPN) servers, and so on). The information can include logs from each of the network devices, and can include VPN logs, Active Directory logs, system logs, firewall logs, user account access records, and so on. The network interaction database 306 can further store identifications of events included across disparate logs that relate to network actions of each user account. The events can be ordered according to time (e.g., from time stamps included in logs), which provide a temporal history of network actions taken, or initiated, by each user account.

The risk assessment system 100 includes a network identification engine 320 configured to obtain information stored in the network traffic information database 302 and determine and/or update a network topology of the network 110. As noted above, a network topology identifies nodes in the network 110, e.g., one or more network devices grouped as a node, and connections between the nodes, e.g., network devices permitted to access other network devices. Additionally, the risk assessment system 100 can actively provide requests to network devices included in the network 110, e.g., traceroute requests, to identify connections between network devices. The risk assessment system 100 can also direct network devices in the network 110 to provide requests to other network devices, e.g., to identify connections between network devices, and receive indications of whether requests to respective devices was successful.

Additionally, the risk assessment system 100 includes a path expected value engine 330 to determine expected values of user accounts compromising high value nodes (e.g., as described above in FIG. 2A-2D). The path expected value engine 330 can determine compromise values associated with each node in the network topology, e.g., approximate costs that would be incurred to a company that owns the network 110 if one or more network devices were compromised. As described above, a compromise value for a node can be based on a type of information that the node stores (e.g., personal or financial information), and/or a use of the node (e.g., a domain controller enabling privileged user access, a point-of-sale system, a server system, and so on). Additionally, the path expected value engine 330 can determine communication weights for edges connecting nodes, with the communication weights indicating a frequency of communication events between the nodes. As will be described below, the communication weights can be utilized by the path expected value engine 330 to inform a likelihood of an edge between two nodes being utilized by a malicious actor.

Furthermore, the path expected value engine 330 can determine compromise likelihoods associated with each node and user account. To determine a compromise likelihood of a node, the path expected value engine 330 can obtain information describing software executing on the node, or hardware included in the node. The path expected value engine 330 can determine the compromise likelihood based on a complexity of the software, historical information describing vulnerabilities of the software, an importance of the node, the compromise value associated with the node, and so on. To determine a compromise likelihood of a user account, the path expected value engine 330 can compare user behavior of the user account to behavior indicative of the user account being compromised, or at an increased risk of being compromised.

In some implementations, the path expected value engine 330 can monitor user accounts to determine whether their compromise likelihoods are greater than a threshold compromise likelihood. The path expected value engine 330 can then identify (e.g., flag) the user accounts for review by a system administrator, and upon review, can determine expected values of the identified user accounts accessing one or more high value nodes.

The path expected value engine 330 can also generate user interface data identifying the network topology, and paths that one or more user accounts can take to one or more high value nodes. The path expected value engine 330 can determine a respective expected value of each user account accessing each high value node, and include one or more expected values in the user interface data. The user interface data is configured to be provided for presentation, and receive interactions from a system administrator using the risk assessment system 100. Example user interfaces are described above, with reference to FIGS. 2A-2D.

Example Methods

Figure 4:
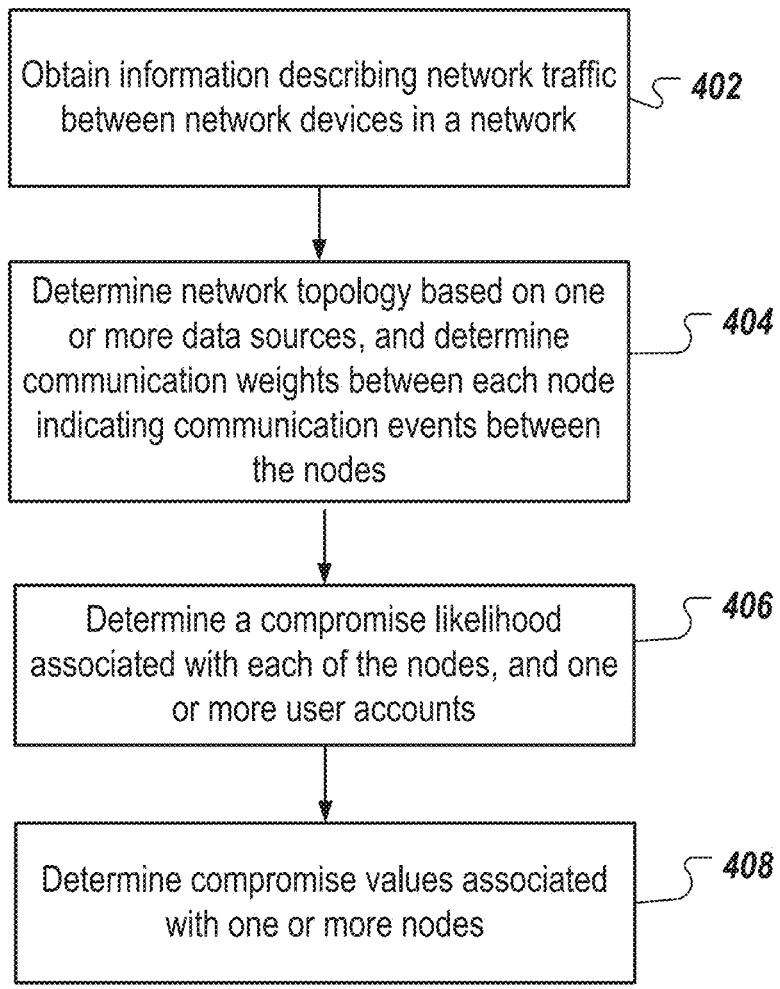
FIG. 4 illustrates a flowchart of an example process for determining compromise values and compromise likelihoods.

FIG. 4 illustrates a flowchart of an example process 400 for determining compromise values and compromise likelihoods. For convenience, the process 400 will be described as being performed by a system of one or more computers, e.g., the risk assessment system 100. Depending on the embodiment, the method of FIG. 4 may include fewer or additional blocks and the blocks may be performed in an order that is different than illustrated.

The system obtains information describing network traffic between network devices in a network (block 402). The system can obtain the information, e.g., router logs, router rules, firewall logs, and so on, from one or more databases. Information describing network traffic is any information that identifies one or more network devices that can communicate with, or access, each other. In some implementations, the system maintains the databases and retrieves the information, e.g., from routing devices, for storage in the databases. In some other implementations, the system can access the databases that have been pre-populated with information describing network traffic.

As described above, the information can be from routing systems that route requests from a network device to an appropriate receiving network device. Routing systems can include routers, and proxy servers that hide an identification of the requesting network device and route the hidden request to a receiving network device. As described below in block 404, the system may obtain proxy logs to identify that two network devices are in communication with each other, even though a proxy server would ordinarily hide that reality.

In some implementations the system can actively determine network devices that can communicate with, or access, each other by providing traceroute requests to all network devices. A traceroute request reports the route that the request took to get a receiving network device, e.g., the network devices and routers that the request was provided to. If the system receives a response identifying the traceroute, the system can store information identifying all the network devices involved in the response and the respective connections between them. Additionally the system can provide a traceroute request to all possible addresses of network devices on particular subnets, e.g., the system can cycle through all permutations of network addresses in the subnet, and identify network devices from traceroute requests that receive a response.

Next, the system determines a network topology from the information describing network traffic, and determines communication weights for each edge connecting nodes (block 404). A network topology identifies nodes that each represents one or more network devices connected by edges, with each edge representing a communication link. Each edge can be associated with a direction from a node to another node, e.g., identifying a direction of communication. Additionally edges can be bi-directional. In some implementations, the system can represent all network devices that belong to a particular subnet as being a single node. In some other implementations, a system administrator using the system can identify that more than one network device is to belong to a single node.

To determine the network topology, the system can obtain router logs (e.g., NETFLOW data) that identifies network traffic between network devices that provide requests to, or receive requests from, routers. The system then identifies pairs of network devices that have communicated, and represents the network devices as nodes connected by respective edges. Additionally, the system can obtain and utilize firewall logs, proxy logs, router rules, and so on.

The system determines communication weights to assign to each edge between nodes. As described above, a communication weight indicates a frequency of, or total occurrence of, communication events between two nodes. The system can determine a communication weight for an edge based on communication events for all other edges. That is, the system can quantify communication events (e.g., in a user selectable period of time) for each edge in the network topology, and normalize the communication events to determine a relative weight to apply to each node.

The system determines compromise likelihoods for the nodes included in the network topology and one or more user accounts (block 408). As described above, a compromise likelihood indicates a likelihood of a node or user account being improperly accessed. As will be described below, in some implementations the system can monitor user behavior and identify (e.g., flag) user accounts for review that are associated with a compromise likelihood that exceeds a threshold. In this way, the system can detect occurrences of a user account being compromised, and then determine expected value costs of the user account accessing high value nodes.

To determine a compromise likelihood of a node, the system can obtain information identifying user accounts that are permitted to access the node, and obtain information identifying password complexities of each user account, locations that persons associated with the user accounts normally log in from, length of time that the persons have worked at the company, and so on. The system can identify whether the node is associated with a high compromise value, e.g., identifying that the node is an important target, or whether the node is permitted to access another node with a high compromise value. Compromise likelihood may consider linkages (e.g. proximity to insecure parts of the network), attributes (e.g. software version) for a given node, and/or an academic theory like attack graphs in computing a compromise likelihood of a node. This information can be provided to the machine learning model, described above, and the system can obtain a probability identifying a chance the node will get compromised.

Similarly, to determine a compromise likelihood of a user account, the system can obtain information identifying a complexity of the user account password, the location that a person associated with the user account normally logs into nodes from, a length of time the person has worked at the company that controls the network, one or more values identifying an importance of the user account, and so on. This information can be provided to a machine learning model, e.g., a neural network, a Gaussian mixture model, and so on, and the system can obtain a probability identifying a chance the user account will get compromised.

Furthermore, the system can obtain information indicating an importance of the user account, such as privileges associated with the user account, group membership information, a job title of a user associated with the user account, and so on. For instance, the system can increase the compromise likelihood of a user account upon determining (e.g., based on the group membership information of the user account), that the user account has a relatively high level of privileges to access the network (e.g., modify files, access privileged nodes, read privileged data, and so on). Additionally, the system can increase the compromise likelihood of a user account that can access privileged systems (e.g., domain controllers), or that is associated with an important role in a company (e.g., an executive officer, a Chief Security Officer, and so on).

Additionally as described above, the system can determine the compromise likelihood of a user account from user behavior of the user account, and compare the user behavior to behavior known to indicate, alone or in combination, an increased risk of the user account being compromised. For instance as described above, the system can determine that a user account is generally accessed from a greater than average number of hosts (e.g., a user could lose his/her host and a malicious actor could utilize the host to access the network). Additionally, the system can determine that a user account is being accessed from foreign countries that are outside of business locations of a business.

In some implementations, the system can actively monitor user behavior and increase a compromise likelihood of a user account upon determining that the user account is exhibiting behavior indicative of being compromised. For instance, a user account can be accessed from a first location, and then a second location a period of time later, such that no one person could travel fast enough between the two locations to effect the access. This can indicate that the user account is being improperly accessed.

As will be described below, upon determining that a user account is exhibiting behavior indicative of being compromised, the user account can be identified (e.g., flagged) for further review by a system administrator. The system can then determine expected values of the user account accessing high value nodes, and the system administrator can view one or more paths the user account can take to access the high value nodes. In this way, the system administrator can take remedial actions to hinder the user account accessing one or more nodes included in the paths.

The system determines compromise values associated with one or more nodes (block 408). As described above, the system can obtain information indicating compromise values of high value nodes (e.g., nodes indicated by a system administrator or other user as being high value). In some implementations, the system determines (e.g., estimates) compromise values of nodes, and identifies high value nodes as nodes with compromise values greater than a threshold (e.g., a user selectable threshold), or greater than a percentile of remaining compromise values.

For instance, a compromise value for a node can be the cost of the data stored by the node, such as a value to recover the data, a value to ensure that all data stored by nodes has not been tampered with, a value to pay for specialized services associated with loss of the data (e.g., credit monitoring), costs of insurance deductibles and/or increases in premiums, and/or any other costs. The compromise value of a node can also be the cost incurred by a company that owns the network if the node were out of service, e.g., offline. The cost can be the cost incurred per day by the company, or cost incurred hourly (or any other unit of time). The compromise value can also factor in the cost to replace the node, and information stored on it. Additionally, any compromise of the network can be associated with a compromise value that is in addition to a compromise value of each node, e.g., a reputational compromise value. This reputational compromise value identifies an expected loss to the company that operates the network, e.g., any quantifiable loss of investor faith, loss of consumer faith, or costs incurred with respect to average legal fees to defend itself in a lawsuit by a government or a consumer.

In some implementations the system can obtain information that describes what each node stores, and determine an associated compromise value based on the information. To determine an associated compromise value, the system can store mappings between specific types of information and associated costs. For instance, if the system obtains information identifying a particular node that stores credit card information, the system can determine an associated cost based on an expected cost per particular credit card.

Figure 5:
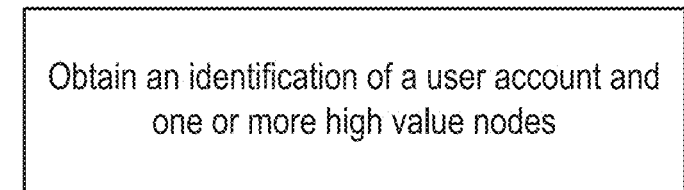
FIG. 5 illustrates a flowchart of an example process for determining expected values of a user account improperly accessing high value nodes.
Figure 5:
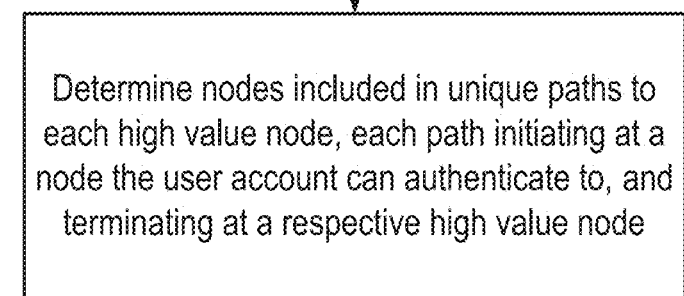
Figure 5:
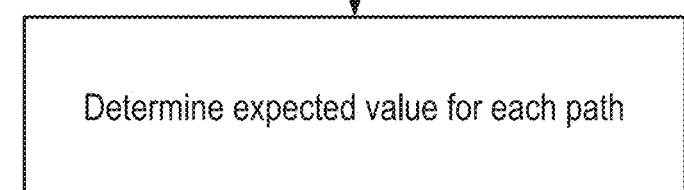
Figure 5:
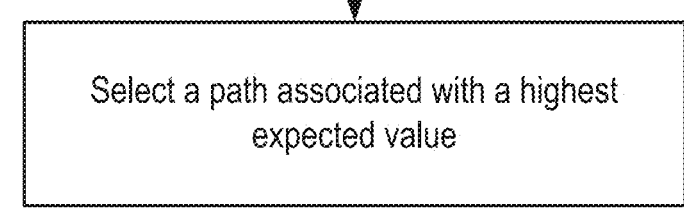

FIG. 5 illustrates a flowchart of an example process 500 for determining expected values of a user account improperly accessing high value nodes. For convenience, the process 500 will be described as being performed by a system of one or more computers, e.g., the risk assessment system 100. Depending on the embodiment, the method of FIG. 5 may include fewer or additional blocks and the blocks may be performed in an order that is different than illustrated.

The system obtains an identification of a user account and one or more high value nodes (block 502). As described above, the system can obtain an identification of a user account to review from a user (e.g., a system administrator). In some implementations, the system can provide (e.g., for presentation to a user) information identifying user accounts for review. The system can select the user accounts as user accounts associated with a high compromise likelihood (e.g., as described above). Additionally, in implementations in which the system is monitoring user behavior, the system can identify (e.g., flag) user accounts for review and presentation to the user (e.g., system administrator). The user (e.g., system administrator) can then select a user account, and the system can obtain identifications of high value nodes (e.g., as described above).

The system determines nodes included in unique paths to each high value node (block 504). The system obtains information identifying nodes the selected user account can authenticate to, and from the network topology, determines one or more unique paths that terminates at each high value node. The system can utilize one or more graphing algorithms to determine each unique path, including a shortest path algorithm, Dijsktra's algorithm, and so on. After determining unique paths, the system can store information describing the path (e.g., for later presentation to a system administrator or other user). Each unique path can therefore be associated with an order of unique combinations of nodes included in the path, and the system can store information describing the order and identifications of each node.

The system determines an expected value for each path (block 506). As described above, the system determines an expected value for a path from the compromise value associated with a high value node, the compromise likelihoods of each node included in the path being accessed, and the communication weights associated with each edge included in the path.

In some implementations, the system can determine a total compromise likelihood of the path, and then combine (e.g., multiply) the total compromise likelihood and the compromise value associated with the high value node.

To determine a total compromise likelihood of the path, the system can compute the conditional probability of the user account accessing the high value node given that the user account accessed the prior nodes included in the path. As described above, in some implementations the system can store information identifying software executing on each node, and determine that multiple nodes included in the path can take similar vulnerabilities (e.g., similar vulnerabilities can be exploited, such as vulnerabilities indicated by the Common Vulnerability Scoring System). In these implementations, the system can determine that if a node with a vulnerability was accessed, a subsequent node with a same, or similar, vulnerability is likely to be accessed (e.g., at a 90% likelihood, 92%, or 100%). After determining the conditional probability, the system can modify the probability according to a probability that a malicious attacker would utilize the particular path (e.g., based on the communication weights). Additionally, the system can decrease or increase the conditional probability based on the compromise likelihood of the user account (e.g., if a user account is unlikely to be accessed, the total compromise likelihood can be lowered).

The system selects a path associated with a highest expected value (block 508). The system selects the path with the highest total compromise likelihood, which corresponds to the path with the highest expected value. After selecting the path, the system computes the expected value which can include combining (e.g., multiplying) the total compromise likelihood by the compromise value of the high value node. In some implementations, the total compromise likelihood and compromise value can be weighted.

Alternative to determining a total compromise likelihood of each path, and selecting a highest total compromise likelihood, the system can compute a likelihood of the user account accessing the high value node through any path. The system can determine the likelihood by modeling the network topology as a probabilistic Markov chain, with the communication weights indicating a likelihood of the user account utilizing the edge, and the compromise likelihoods for each node indicating a likelihood of the user account successfully accessing the node. In this way, the system can then determine a likelihood of the user account accessing the high value node, and determine an expected value utilizing the likelihood and the compromise value associated with the high value node.

The system can generate user interface data describing the selected path, or any of the other paths, which is described above (e.g., with reference to FIGS. 2A-2D).

In addition to the description of FIGS. 1-5 above, the system, e.g., the risk assessment system 100, can generate and provide recommendations to a system administrator using the system, e.g., a network administrator. For instance, the system can automatically identify changes in the network (e.g., the network 110) that will lower total compromise values and/or compromise likelihoods associated with the network and/or specific user accounts, nodes. The system can obtain information identifying nodes that user accounts have actually used in a defined time period, and determine whether blocking access to remaining nodes, e.g., nodes user accounts don't actually use, will lower the total compromise likelihood of one or more paths. For example, the system may provide recommendations to limit users' access rights to only those resources, e.g., nodes or objects within nodes, that particular user accounts have accessed within some previous time period, such as 30 or 60 days. In some embodiments, the system may have sufficient user access rights to ACL settings on nodes of the network to actually initiate changes of user access rights, such as by transmitting information regarding changes to ACL rules to respective nodes.

As described above, a path can include nodes (1) initiating from a node a particular user account can access (e.g., authenticate to) and (2) terminating at a high value node. In some implementations, as described above, a path can include a first node accessible by a particular user account, and a subsequent node accessible after the particular user account transitions to a subsequent user account, which can access the subsequent node. In these implementations, when determining an expected value of such a path (e.g., a path in which the particular user account transitions to subsequent user accounts), the system can modify the expected value for the path according to compromise likelihoods of the subsequent user accounts.

As described in block 506, the system can determine a total compromise likelihood of a path, for instance, the system can compute a conditional probability of a particular user account accessing a high value node given that the particular user account accessed the prior nodes in the path (e.g., the system can utilize the compromise likelihood of each node and the communication weights between nodes indicating transition probabilities). Upon a transition to a subsequent user account, the system can modify the conditional probability based on the compromise likelihood of the subsequent user account (e.g., the system can reduce the conditional probability of the high value node being accessed based on a likelihood that the subsequent user account can be transitioned to).

Therefore, the system can broaden paths available from an initial user account to a high value node, by incorporating transitions from the initial user account to one or more subsequent user accounts that can access nodes the initial user account cannot access. Since multiple user accounts may be able to access a same subsequent node, when determining a path the system can select a particular user account from the multiple user accounts with a highest compromise likelihood (e.g., the particular user account is most easily compromised, which can represent a worst-case scenario for the high value node being improperly accessed). Alternatively, the system can determine a measure of central tendency of compromise likelihoods of user accounts that can access a subsequent node, and utilize the measure of central tendency when determining a total compromise likelihood of the path. In some implementations, transitions to a subsequent user account can be associated with an additional likelihood indicating a likelihood that the subsequent user account can be identified by an attacker (e.g., user accounts with names that include "Admin" might be more easily assumed to be able to access the subsequent node, and will have a corresponding higher likelihood than user accounts that do not include easily identifiable features).

Example System Implementation and Architecture

Figure 6:
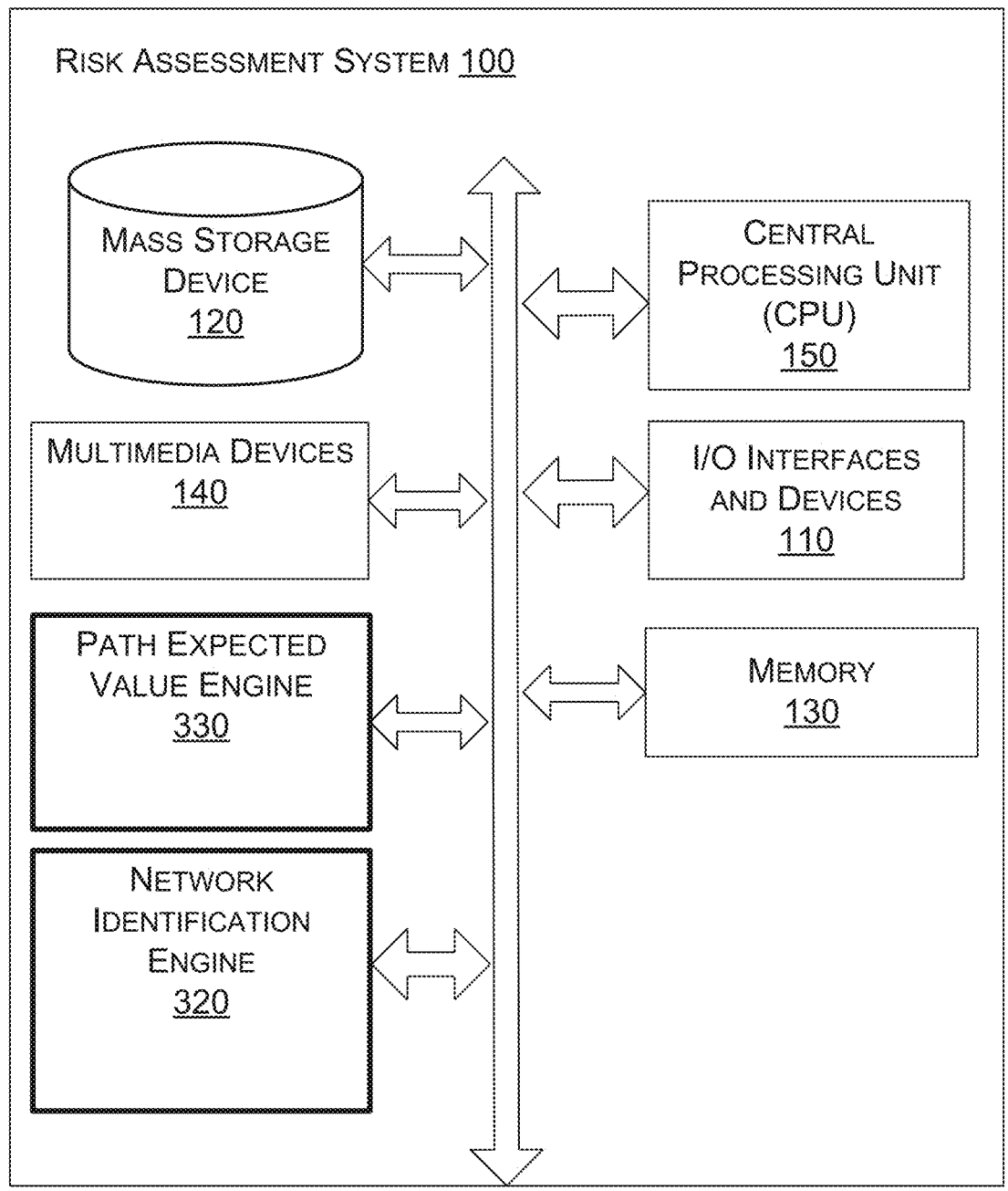
FIG. 6 is a block diagram of one embodiment of the risk assessment system, including example components and modules.

FIG. 6 is a block diagram of one embodiment of the risk assessment system 100, including example components and modules. In the embodiment of FIG. 6, the risk assessment system 100 includes the path expected value engine 330 and the network identification engine 320 discussed above with reference to FIG. 3. These "engines," which are also referred to herein as "modules," are configured for execution by the CPU 150 and may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The risk assessment system 100 includes, for example, one or more servers, workstations, or other computing devices. In one embodiment, the exemplary risk assessment system 100 includes one or more central processing units ("CPU") 150, which may each include a conventional or proprietary microprocessor. The risk assessment system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules (or "engines") of the risk assessment system 100 are connected to the computer using a standard based bus system. In different embodiments, the standard based bus system could be implemented in Peripheral Component Interconnect ("PCP"), Microchannel, Small Computer System Interface ("SCSI"), Industrial Standard Architecture ("ISA"), and Extended ISA ("EISA") architectures, for example. In addition, the functionality provided for in the components and modules of risk assessment system 100 may be combined into fewer components and modules or further separated into additional components and modules.

The risk assessment system 100 is generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the risk assessment system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary risk assessment system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The risk assessment system 100 may also include one or more multimedia devices 140, such as speakers, video cards, graphics accelerators, and microphones, for example.

The I/O devices and interfaces 110 provide a communication interface to various external devices such as, for example, the network 110 (FIG. 1). The network 110 may comprise one or more of a LAN, WAN, and/or the Internet, for example, via a wired, wireless, or combination of wired and wireless, communication link. The network 110 communicates with various computing devices and/or other electronic devices via wired or wireless communication links.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The term "a" as used herein should also be given an inclusive rather than exclusive interpretation. For example, unless specifically noted, the term "a" should not be understood to mean "one" or "one and only one"; instead, the term "a" generally means "one or more" in open-ended claims or embodiments when used with language such as "comprising" or "including."

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method comprising:
    by a system of one or more computer systems,
    identifying, based on monitored user behavior associated with a network, a particular user account of a set of user accounts for review;
    determining respective expected values of the particular user account accessing a set of nodes included in a plurality of nodes which are associated with a network topology of the network,
        wherein individual expected values are based, at least in part, on communication weights between nodes included in unique paths to an individual node of the set of nodes, wherein communication weights associated with nodes included in the unique paths are indicative of an access likelihood of a user transitioning between the nodes,
        wherein two or more paths are associated with a particular node of the plurality of nodes, wherein each path is associated with a different subset of the set of nodes, and wherein a particular path of the two or more paths is associated with an increased access likelihood by the particular user account; and
    causing presentation, via a user device, of an interactive user interface, wherein the interactive user interface:
        presents a graphical representation of the set of nodes, wherein individual expected values are presented proximate to individual nodes of the set of nodes, and
        responds to user input provided to the graphical representation which selects the particular node and presents a graphical representation of the particular path the particular user account is configured to take from an initial node to the particular node, wherein the computer systems select the particular path for presentation from remaining of the two or more paths, such that the remaining of the two or more paths are not presented via the interactive user interface.

2. The method of claim 1, wherein each unique path initiates at a respective node to which the particular user account can authenticate and indicates transitions between nodes which terminate at a node of the set of nodes.

3. The method of claim 1, wherein upon selection of the node, the interactive user interface presents an expected value of the particular user account accessing the selected node.

4. The method of claim 1, wherein the interactive user interface is configured to present representations of unique paths to the set of nodes, wherein the presented representations of unique paths correspond to paths which are most likely based on determined compromise likelihoods associated with the unique paths.

5. The method of claim 1, wherein the interactive user interface presents summary information for nodes which are associated with expected values greater than a threshold.

6. The method of claim 1, wherein the interactive user interface includes summary information which indicates a total expected value of the particular user account being compromised, and wherein the total expected value represents a quantifiable risk of the particular user account accessing the set of nodes.

7. The method of claim 1, wherein the interactive user interface is configured to present a representation of a network topology and nodes included in one or more unique paths to a particular node of the set of nodes.

8. A system comprising one or more computers and computer storage media storing instructions that, when executed by the system, cause the system to perform operations comprising:
    identifying, based on monitored user behavior associated with a network, a particular user account of a set of user accounts for review;
    determining respective expected values of the particular user account accessing a set of nodes included in a plurality of nodes which are associated with a network topology of the network,
        wherein individual expected values are based, at least in part, on communication weights between nodes included in unique paths to an individual node of the set of nodes, wherein communication weights associated with nodes included in the unique paths are indicative of an access likelihood of a user transitioning between the nodes,
        wherein two or more paths are associated with a particular node of the plurality of nodes, wherein each path is associated with a different subset of the set of nodes, and wherein a particular path of the two or more paths is associated with an increased access likelihood by the particular user account; and
    causing presentation, via a user device, of an interactive user interface, wherein the interactive user interface:
        presents a graphical representation of the set of nodes, wherein individual expected values are presented proximate to individual nodes of the set of nodes; and
        responds to user input provided to the graphical representation which selects the particular node and presents a graphical representation of the particular path the particular user account is configured to take from an initial node to the particular node, wherein the computer systems select the particular path for presentation from remaining of the two or more paths, such that the remaining of the two or more paths are not presented via the interactive user interface.

9. The system of claim 8, wherein each unique path initiates at a respective node to which the particular user account can authenticate and indicates transitions between nodes which terminate at a node of the set of nodes.

10. The system of claim 8, wherein upon selection of the node, the interactive user interface presents an expected value of the particular user account accessing the selected node.

11. The system of claim 8, wherein the interactive user interface is configured to present representations of unique paths to the set of nodes, wherein the presented representations of unique paths correspond to paths which are most likely based on determined compromise likelihoods associated with the unique paths.

12. The system of claim 8, wherein the interactive user interface presents summary information for nodes which are associated with expected values greater than a threshold.

13. The system of claim 8, wherein the interactive user interface includes summary information which indicates a total expected value of the particular user account being compromised, and wherein the total expected value represents a quantifiable risk of the particular user account accessing the set of nodes.

14. The system of claim 8, wherein the interactive user interface is configured to present a representation of a network topology and nodes included in one or more unique paths to a particular node of the set of nodes.

15. Non-transitory computer storage media storing instructions that when executed by a system of one or more computers, cause the system to perform operations comprising:
identifying, based on monitored user behavior associated with a network, a particular user account of a set of user accounts for review;
determining respective expected values of the particular user account accessing a set of nodes included in a plurality of nodes which are associated with a network topology of the network,
wherein individual expected values are based, at least in part, on communication weights between nodes included in unique paths to an individual node of the set of nodes, wherein communication weights associated with nodes included in the unique paths are indicative of an access likelihood of a user transitioning between the nodes,
wherein two or more paths are associated with a particular node of the plurality of nodes, wherein each path is associated with a different subset of the set of nodes, and wherein a particular path of the two or more paths is associated with an increased access likelihood by the particular user account; and
causing presentation, via a user device, of an interactive user interface, wherein the interactive user interface:
presents a graphical representation of the set of nodes, wherein individual expected values are presented proximate to individual nodes of the set of nodes, and
responds to user input provided to the graphical representation which selects the particular node and presents a graphical representation of the particular path the particular user account is configured to take from an initial node to the particular node, wherein the computer systems select the particular path for presentation from remaining of the two or more paths, such that the remaining of the two or more paths are not presented via the interactive user interface.

16. The computer storage media of claim 15, wherein upon selection of the node, the interactive user interface presents an expected value of the particular user account accessing the selected node.

17. The computer storage media of claim 15, wherein the interactive user interface is configured to present representations of unique paths to the set of nodes, wherein the presented representations of unique paths correspond to paths which are most likely based on determined compromise likelihoods associated with the unique paths.

18. The computer storage media of claim 15, wherein the graphical representation includes summary information which indicates a total expected value of the particular user account being compromised, and wherein the total expected value represents a quantifiable risk of the particular user account accessing the set of nodes.

19. The computer storage media of claim 15, wherein the interactive user interface is configured to present a representation of a network topology and nodes included in one or more unique paths to a particular node of the set of nodes.

\* \* \* \* \*